US009088503B2

(12) United States Patent
Yasuda et al.

(10) Patent No.: US 9,088,503 B2
(45) Date of Patent: Jul. 21, 2015

(54) MULTI-TENANT INFORMATION PROCESSING SYSTEM, MANAGEMENT SERVER, AND CONFIGURATION MANAGEMENT METHOD

(75) Inventors: Yoshiko Yasuda, Saitama (JP); Yosuke Himura, Tokyo (JP); Hideki Okita, Sunnyvale, CA (US); Mariko Nakayama, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 475 days.

(21) Appl. No.: 13/421,308

(22) Filed: Mar. 15, 2012

(65) Prior Publication Data

US 2012/0311120 A1 Dec. 6, 2012

(30) Foreign Application Priority Data

Jun. 2, 2011 (JP) ................................ 2011-124311

(51) Int. Cl.
*H04L 12/24* (2006.01)

(52) U.S. Cl.
CPC .......... *H04L 41/145* (2013.01); *H04L 41/0803* (2013.01)

(58) Field of Classification Search
CPC .......................... H04L 41/145; H04L 41/0803
USPC .......................................................... 709/223
See application file for complete search history.

(56) References Cited

U.S. PATENT DOCUMENTS

2004/0205179 A1* 10/2004 Hunt et al. .................... 709/223
2006/0111880 A1* 5/2006 Brown et al. ..................... 703/1
2009/0113031 A1* 4/2009 Ruan et al. ..................... 709/223
2009/0327471 A1* 12/2009 Astete et al. .................. 709/223
2010/0017517 A1* 1/2010 Arai et al. ...................... 709/226
2012/0278425 A1* 11/2012 Maxted ......................... 709/217

FOREIGN PATENT DOCUMENTS

EP 869450 A2 * 10/1998 .............. G06F 17/50
JP 2004-40374 A 2/2004
JP 2004-272908 A 9/2004

OTHER PUBLICATIONS

Masahiro Yoshizawa et al., "Implementation ad Evaluation of Network Management System to Reduce Management Cost Caused by Server Virtualization", The Institute of Electronics, Information and Communication Engineers, IEICE Technical Report, Nov. 2009, pp. 71-76 including English translation (Twenty-seven (27) pages).

* cited by examiner

*Primary Examiner* — Michael C Lai
(74) *Attorney, Agent, or Firm* — Crowell & Moring LLP

(57) ABSTRACT

In a multi-tenant information processing system, when initially constructing a tenant, design items depending on the tenant are specified for each device constituting the tenant, and design values of the design items are calculated without overlapping with those of other tenants. In a tenant design item management table, the design items set for the devices and information indicating whether the design items depend on the tenant, are stored for each device. In a design algorithm management table, calculation formulae for making the design values to be different for each tenant are stored corresponding to the design items. A tenant design unit refers to the tenant design item management table, specifies the design items depending on the tenant among those corresponding to the devices constituting the tenant, calculates the design values of the design items according to the calculation formula, when initially constructing the tenant.

13 Claims, 20 Drawing Sheets

350a TENANT DESIGN ITEM MANAGEMENT TABLE (FW2)

| DESIGN INFORMATION (501) | SUB-ITEMS (502) | TENANT DEPENDENCE (503) | CLASSIFICATION (504) | POINTERS TO BE ACCESSED (505) | IDENTIFIERS TO BE REFERRED (506) | |
|---|---|---|---|---|---|---|
| VIRTUAL ROUTER | ZONE IDENTIFIER | ○ | CALCULATION | TENANT DESIGN ALGORITHM MANAGEMENT TABLE | T1-1 | 510a |
| | VIRTUAL ROUTER IDENTIFIER | ○ | CALCULATION | TENANT DESIGN ALGORITHM MANAGEMENT TABLE | T1-2 | 510b |
| SUB-INTERFACE | SUB-INTERFACE IDENTIFIER | ○ | CALCULATION | TENANT DESIGN ALGORITHM MANAGEMENT TABLE | T1-3 | 510c |
| | VLAN IDENTIFIER | ○ | CALCULATION | TENANT DESIGN ALGORITHM MANAGEMENT TABLE | T1-4 | 510d |
| | IP ADDRESS | ○ | CALCULATION | TENANT DESIGN ALGORITHM MANAGEMENT TABLE | T1-5 | 510e |
| | NETMASK | × | REFERENCE | TENANT INDEPENDENT ITEM MANAGEMENT TABLE | T2-1 | 510f |
| | ZONE IDENTIFIER | ○ | REFERENCE | TENANT DESIGN VALUE MANAGEMENT TABLE | FW2-7 | 510g |
| SERVER ADDRESS | SERVER IDENTIFIER | ○ | CALCULATION | TENANT DESIGN ALGORITHM MANAGEMENT TABLE | T1-6 | 510h |
| | IP ADDRESS | ○ | REFERENCE | ADDRESS MANAGEMENT TABLE | T4-1 | 510i |
| | NETMASK | × | REFERENCE | TENANT INDEPENDENT ITEM MANAGEMENT TABLE | T2-2 | 510j |
| | ZONE IDENTIFIER | ○ | REFERENCE | TENANT DESIGN VALUE MANAGEMENT TABLE | FW2-10 | 510k |
| ROUTE TABLE | VIRTUAL ROUTER IDENTIFIER | ○ | REFERENCE | TENANT DESIGN VALUE MANAGEMENT TABLE | FW2-12 | 510l |
| | SUB-INTERFACE IDENTIFIER | ○ | REFERENCE | TENANT DESIGN VALUE MANAGEMENT TABLE | FW2-13 | 510m |
| | DEFAULT ROUTE, NETMASK | × | REFERENCE | TENANT INDEPENDENT ITEM MANAGEMENT TABLE | T2-3 | 510n |
| | GATEWAY | ○ | CALCULATION | TENANT DESIGN ALGORITHM MANAGEMENT TABLE | T1-7 | 510o |
| POLICY | POLICY IDENTIFIER | ○ | CALCULATION | TENANT DESIGN ALGORITHM MANAGEMENT TABLE | T1-8 | 510p |
| | ZONE IDENTIFIER | ○ | REFERENCE | TENANT DESIGN VALUE MANAGEMENT TABLE | FW2-15 | 510q |
| | SERVER IDENTIFIER | ○ | REFERENCE | TENANT DESIGN VALUE MANAGEMENT TABLE | FW2-16 | 510r |

FIG. 5

351 CONFIGURATION TEMPLATE 601 602

| CONFIGURATION PATTERN IDENTIFIER | CONFIGURATION DEVICE | |
|---|---|---|
| CONFIGURATION PATTERN 1 | SWITCH 1, FW1, SAN2 | 610a |
| CONFIGURATION PATTERN 2 | SWITCH 1, FW1, SWITCH 2, FW2, SAN1 | 610b |
| CONFIGURATION PATTERN 3 | SWITCH 2, FW2, SAN1 | 610c |

FIG. 6

352 DESIGN ALGORITHM MANAGEMENT TABLE

| IDENTIFIERS (701) | CALCULATION FORMULAE (702) |
|---|---|
| T1-1 | ALLOCATION OF (MAXIMUM VALUE OF GENERATED TENANT IDENTIFIER + 1) |
| T1-2 | ALLOCATION OF (MAXIMUM VALUE OF GENERATED TENANT IDENTIFIER + 1) |
| T1-3 | ALLOCATION OF (MAXIMUM VALUE OF GENERATED TENANT IDENTIFIER + 1) |
| T1-4 | ALLOCATION OF (VRF IDENTIFIER * 5 + 1) |
| T1-5 | ALLOCATION OF x.x.(MAXIMUM VALUE OF GENERATED TENANT IDENTIFIER + 1).x |
| T1-6 | ALLOCATION OF (MAXIMUM VALUE OF GENERATED TENANT IDENTIFIER + 1) |
| T1-7 | ALLOCATION OF y.y.(MAXIMUM VALUE OF GENERATED TENANT IDENTIFIER + 1).y |
| T1-8 | ALLOCATION OF (MAXIMUM VALUE OF GENERATED TENANT IDENTIFIER * 100) + THE NUMBER OF POLICIES SET IN APPROPRIATE TENANT + 1 |

353a TENANT DESIGN VALUE MANAGEMENT TABLE

| TENANT IDENTIFIERS (801) | DEVICES (802) | IDENTI-FIERS (803) | DESIGN INFORMATION (804) | SUB-ITEMS (805) | DESIGN VALUES (806) | REFERENCE DESTINATIONS (TENANTS-DEVICE IDENTIFIERS) (807) | |
|---|---|---|---|---|---|---|---|
| 1 | FW2 | 1 | VIRTUAL ROUTER | ZONE IDENTIFIER | Zone1 | | 810a |
| | | 2 | | VIRTUAL ROUTER IDENTIFIER | VR1 | | 810b |
| | | 3 | SUB-INTERFACE | SUB-INTERFACE IDENTIFIER | 0.11 | | 810c |
| | | 4 | | VLAN IDENTIFIER | 2020 | | 810d |
| | | 5 | | IP ADDRESS | 10.1.1.1 | | 810e |
| | | 6 | | NETMASK | /28 | | 810f |
| | | 7 | | ZONE IDENTIFIER | Zone1 | 1-FW2-1 | 810g |
| | | 8 | SERVER ADDRESS | SERVER IDENTIFIER | tenant1-SV1 | | 810h |
| | | 9 | | IP ADDRESS | 192.168.1.1 | | 810i |
| | | 10 | | NETMASK | 255.255.255.255 | | 810j |
| | | 11 | | ZONE IDENTIFIER | Zone1 | 1-FW2-1 | 810k |
| | | 12 | ROUTE TABLE | VIRTUAL ROUTER IDENTIFIER | VR1 | 1-FW2-2 | 810l |
| | | 13 | | SUB-INTERFACE IDENTIFIER | 0.11 | 1-FW2-3 | 810m |
| | | 14 | POLICY | POLICY IDENTIFIER | 2 | | 810n |
| | | 15 | | ZONE IDENTIFIER | Zone1 | 1-FW2-1 | 810o |
| | | 16 | | SERVER IDENTIFIER | tenant1-SV1 | 1-FW2-8 | 810p |

FIG. 8

353b TENANT DESIGN VALUE MANAGEMENT TABLE (SWITCH PART)

| TENANT IDENTIFIER (901) | DEVICE (902) | IDENTIFIERS (903) | DESIGN INFORMATION (904) | SUB-ITEMS (905) | DESIGN VALUES (906) | REFERENCE DESTINATIONS (907) | |
|---|---|---|---|---|---|---|---|
| 1 | SW1 | 1 | VLAN | VLAN IDENTIFIERS | 2021 | | 910a |
| | | 2 | ROUTE TABLE | GATEWAY | 10.1.1.254 | | 910b |

FIG. 9

354 TENANT INDEPENDENT ITEM MANAGEMENT TABLE 1001 1002 1010a 1010b 1010c

| IDENTIFIERS | DESIGN VALUES |
|---|---|
| T2-1 | 255.255.255.254 |
| T2-2 | 255.255.255.255 |
| T2-3 | 0.0.0.0/255.255.255.0 |

FIG. 10

358 TENANT PATTERN MANAGEMENT TABLE

| TENANT IDENTIFIERS (1601) | PATTERN IDENTIFIERS (1602) | TENANT NAMES (1603) | HISTORY IDENTIFIERS (1604) | |
|---|---|---|---|---|
| 1 | CONFIGURATION PATTERN 2 | TENANT 1 | 1 | 1610a |
| 2 | CONFIGURATION PATTERN 1 | TENANT 2 | 0 | 1610b |
| 3 | CONFIGURATION PATTERN 2 | TENANT 3 | 1 | 1610c |

FIG. 16

359 COMMAND PATTERN MANAGEMENT TABLE (CONFIGURATION PATTERN 1, NEW CONFIGURATION)

1701 1702

| DEVICE IDENTIFIERS | COMMAND PATTERNS | |
|---|---|---|
| SW1 | interface vlan <VLAN IDENTIFIER><br>ip address <GATEWAY IDENTIFIER> <NETMASK><br>... | 1710a |
| FW1 | set vrouter name <VIRTUAL ROUTER IDENTIFIER><br>set zone <ZONE IDENTIFIER><br>set interface <INTERFACE IDENTIFIER><br>tag <VLAN IDENTIFIER> zone <ZONE IDENTIFIER><br>... | 1710b |

FIG. 17

355a RESOURCE MANAGEMENT TABLE (VRF)

1901, 1902, 1903

| IDENTIFIERS | RESOURCE USAGE STATUSES | TENANT IDENTIFIERS | |
|---|---|---|---|
| 1 | USED | TENANT 1 | 1910a |
| 2 | USED | TENANT 2 | 1910b |
| 3 | USED | TENANT 3 | 1910c |
| .. | NULL | | 1910d |
| 255 | NULL | | 1910e |

355b RESOURCE MANAGEMENT TABLE (VLAN)

1921, 1922, 1923

| IDENTIFIERS | RESOURCE USAGE STATUSES | TENANT IDENTIFIERS | |
|---|---|---|---|
| 1 | USED | TENANT 1 | 1930a |
| 2 | USED | TENANT 1 | 1930b |
| 3 | USED | TENANT 1 | 1930c |
| .. | NULL | | 1930d |
| 4095 | NULL | | 1930e |

355c RESOURCE MANAGEMENT TABLE (VIRTUAL ROUTER)

1941, 1942, 1943

| IDENTIFIERS | RESOURCE USAGE STATUSES | TENANT IDENTIFIERS | |
|---|---|---|---|
| 1 | USED | TENANT 1 | 1950a |
| 2 | NULL | | 1950b |
| 3 | USED | TENANT 2 | 1950c |
| .. | NULL | | 1950d |
| 10 | NULL | | 1950e |

FIG. 19

MULTI-TENANT INFORMATION PROCESSING SYSTEM, MANAGEMENT SERVER, AND CONFIGURATION MANAGEMENT METHOD

CLAIM OF PRIORITY

The present application claims priority from Japanese patent application JP 2011-124311 filed on Jun. 2, 2011, the contents of which are hereby incorporated by reference into this application.

BACKGROUND OF THE INVENTION

1. Field of the Invention

The present invention relates to a multi-tenant information processing system, a management server, and a configuration management method. More particularly, the present invention relates to a multi-tenant information processing system that aggregates plural business systems (so-called tenants) into a single system, a management server, and a configuration management method in which at the time of initial construction (new configuration) of a tenant, design items set for a network device used by the tenant are automatically calculated so as not to be duplicated among the tenants to ensure independence set between the tenants and the devices.

2. Related Art

In recent years, the application of cloud computing (cloud) to a data center (DC) has been developed and activated. In general clouds, a DC provider virtualizes and constructs plural company IT systems or plural business systems within a company on an information processing system including a server, a storage, and a network. Because the cloud is based on a virtualization technique, the cloud is excellent in scalability as compared with a physical system. On the other hand, because the plural company IT systems are integrated into a single information processing system, the plural IT systems are mixed together, and complicated. The IT systems virtualized or business systems virtualized for respective clients, which are integrated into, for example, the cloud are called “tenants”.

In order to prevent the sophisticated configuration of the system, in an example of the cloud provided at present, virtualized server resources or virtualized storage resources can be customized, but the network configurations are fixed, in the IT system configuration provided to the clients. Therefore, it is limited to apply the cloud to the company IT systems.

On the other hand, a cloud that can configure flexible network connection is also provided. In the cloud of this type, virtualized network resources are managed so that independence among the tenants can be ensured by the aid of a ledger at the time of initially constructing the tenants. In recent years, the virtualized server resources and the virtualized storage resources are pooled, but the virtualized network resources are not pooled. A manager uses an operation process that after determines Nos. (for example, VLAN Nos. or IP addresses) for identifying a virtual network, performs setting. This requires consideration of various devices and types thereof in virtualizing the network resources, which causes the use of a single resource management method to be disabled.

The initial configuration of the tenants in a related art multi-tenant information processing system suffers from the following matters to be solved.

A first matter to be solved resides in that it is difficult to specify design items depending on the tenants in various network devices configuring the multi-tenant information processing system. For example, in the design of a switch of a layer 3 in the multi-tenant information processing system, in order to ensure the independence among the tenants, virtual network identifiers (for example, virtual routing and forwarding (VRF) identifiers) of the layer 3, and virtual network identifiers (for example, virtual LAN (VLAN) identifiers) of a layer 2 are determined for each of the tenants (depending on the tenants). However, the other design items necessary for setting the layer 3 switch, for example, a netmask value is frequently managed as a value not depending on the tenant. Also, among the setting items of a firewall, for examples, identifiers of virtual routers, identifiers of sub-interfaces, VLAN identifiers, server identifiers, and policy identifiers are determined for each of the tenants. On the contrary, the other design items, for example, the netmask value is managed as a value not depending on the tenant. Further, among the design items determined for each of the tenants, there are items required to calculate a design value for each of the tenants, and items referring to the design value calculated once. In this way, in the initial construction of the tenants in the related art multi-tenant information processing system, it is difficult to specify the design items depending on the tenants for each design item of a device.

A second matter to be solved resides in that when the tenant is initially configured, because the tenants can have various network configurations, it is difficult to specify the device constituting the tenant. For example, there are a case in which one tenant configures a three-tiered Web system by the aid of the firewall and the switch of the layer 3, and a case in which another tenant connects only a calculation server by the layer 3 switch. Also, there is a case in which another tenant configures a business system connected to a network-attached storage. Thus, in the related art multi-tenant information processing system, because a device group to be used is different depending on the tenants, it is difficult to specify the device group constituting the tenants.

A third matter to be solved resides in that, even if the device can be specified, and the design items depending on the tenants can be specified, a method of determining the design values of the design items is obscure. For example, in the initial construction of the tenants, when a VLAN of the switch is designed, it is difficult to specify what number should be used as the VLAN identifier for the tenant, more specifically, what number should be used as a VLAN ID. Also, in designing the firewall, when the virtual router is used, it is difficult to specify what should be used as the virtual router identifier. Those values need to be determined to ensure the independence among the tenants.

In order to solve the above matters, in the above-mentioned multi-tenant information processing system, there is a task that the design items depending on the tenants are specified in the devices constituting the tenants, and the design values for the specified design items are promptly calculated without overlapping with another tenant, at the time of initially constructing the tenants.

The following related arts are disclosed.

JP-A-2004-272908 discloses, for example, a method of integrating phases of design, development, and management of the system (Related art 1). The data center is required to host plural applications, but a distributed application frequently has complicated networking requirements, resulting in a high possibility that a work of constructing topology of a physical network so as to comply with the application requirements needs a time-consuming process. Also, this process is liable to incur a human error. In order to solve this matter, Related art 1 discloses a method in which a system is designed by using a system definition model, and the system is developed on one or plural computing devices by using the system definition model.

JP-A-2004-40374 discloses a virtual network designing device, a sub-network designing device, and a virtual network designing method (Related art 2). In Related art 2, in order to accurately complete the design and maintenance of the virtual network in a short time, information on the physical network and the virtual network is display in parallel. As a result, because whether IP addresses are overlapped among the users, or not, can be confirmed on a GUI, design costs can be reduced.

"Implementation and Evaluation of Network Management System EasyLayering for reducing Management Costs under server virtualizing environments", Institute of Electronics, Information and Communication Engineers, Technical Report, NS, Network System 109(273), pp. 71-76, November 2009, discloses a technique in which, for example, physical and logical connection configurations of the server and the network device are managed to facilitate a VLAN setting operation (Related art 3). At the time of increasing the number of virtual servers in the tenants, when an identifier of the VLAN to which the virtual server is connected is entered, the connection configuration of plural switches associated with the input VLAN identifier is retrieved, and an associated switch group is specified to automatically conduct the VLAN setting of the plural switches.

In the above-mentioned Related art 1, at the time of initially constructing the tenants, the device group configured by the tenants can be specified by using the system definition model. However, the matter to be solved by the present invention cannot be solved from the following new points. For example, it is difficult to specify whether the items to be set for the devices depend on each tenant, or not, after the devices configuring each tenant have been specified. Also, it is difficult to calculate the design values set for the respective set items.

In Related art 2, in order to accurately complete the design and maintenance of the virtual network in a short time, the information on the physical network and the virtual network is display at the same time. However, the matter to be solved by the present invention cannot be solved from the following viewpoints. For example, it is difficult to specify whether the items set for the devices configuring each tenant depend on the tenant, or not. Also, it is difficult to specify the devices configuring each tenant. Further, it is difficult to calculate the design values set for the respective design items after the devices configuring each tenant and the design items have been specified.

In Related art 3, when the devices configuring each tenant are a router and a switch, a configuration device for which the design value of the VLAN should be set is specified on the basis of the design value of the VLAN which has been determined by the manager, and the VLAN for that device can be automatically set. However, the matter to be solved by the present invention cannot be solved from the following viewpoints. For example, it is difficult to specify the devices constituting the tenant. Also, it is difficult to specify the design items depending on each tenant among the design items set for the specific device. Further, it is difficult to calculate the design values of the respective design items set for the device.

SUMMARY OF THE INVENTION

The present invention has been made in view of the above circumstances, and therefore an object of the present invention is to provide a multi-tenant information processing system in which, at the time of initially constructing each tenant, design items depending on the tenant are specified according to devices constituting the tenant, and design values of the design items are promptly calculated without overlapping with other tenants.

According to the present invention, in the multi-tenant information processing system of this type, at the time of initially constructing each tenant, the design items depending on the tenant are specified in the devices constituting the tenant, and the design values of the design items are promptly calculated without overlapping with other tenants.

For example, among the items set for the devices configuring each tenant, for the task of specifying the design items depending on the tenant, the design items are classified into the design items depending on the tenant and the design items not depending on the tenant for each of the devices in advance, and the design items depending on the tenant are further classified into items to be calculated and items to be referred.

Also, at the time of initially constructing each tenant, for the task of specifying a device group constituting the tenant, plural kinds of configuration patterns indicating which devices configure the tenant are created in advance to statically determine the devices to be used.

Further, for the tasks of clarifying a method of calculating the design values of the specified design items depending on the tenant, a calculation algorithm is statically managed which prevents each calculation item of the design items depending on the tenant from overlapping among the tenants.

According to the first solving means of this invention, there is provided a management server in a multi-tenant information processing system which includes a plurality of types of network devices, a server device, a storage device, and the management server, configures a tenant which is a virtual system including a desired network device among the network devices, a virtual server realized by the server device, and a virtual storage realized by the storage device for each of clients, and accommodates a plurality of the tenants, the management server comprising:

a tenant design item storage area in which design items to be set in the devices and information indicating whether or not each of the design items depends on the tenant, are stored in advance, for each of the devices constituting the tenant;

a design algorithm storage area in which a calculation rule for calculating design values of the design items so as to be different from each other for each of the tenants is stored in advance, in correspondence with the design items; and a tenant design unit that refers to the tenant design item storage area to specify the design items depending on the tenant among the design items for the devices constituting the tenant, calculates the design values of specified design items depending on the tenant according to the calculation rule in the design algorithm storage area and stores calculated design values at the time of initially constructing the tenant.

According to the second solving means of this invention, there is provided a multi-tenant information processing system which includes a plurality of types of network devices, a server device, a storage device, and the management server, configures a tenant which is a virtual system including a desired network device among the network devices, a virtual server realized by the server device, and a virtual storage realized by the storage device for each of clients, and accommodates a plurality of the tenants, wherein the management server comprises:

a tenant design item storage area in which design items to be set in the devices and information indicating whether or not each of the design items depends on the tenant, are stored in advance, for each of the devices constituting the tenant;

a design algorithm storage area in which a calculation rule for calculating design values of the design items so as to be different from each other for each of the tenants is stored in advance, in correspondence with the design items; and a tenant design unit that refers to the tenant design item storage area to specify the design items depending on the tenant among the design items for the devices constituting the tenant, calculates the design values of specified design items depending on the tenant according to the calculation rule in the design algorithm storage area and stores calculated design values at the time of initially constructing the tenant.

According to the third solving means of this invention, there is provided a configuration management method for obtaining design values set for devices constituting a tenant at the time of newly configuring the tenant, in a multi-tenant information processing system which includes a plurality of types of network devices, a server device, a storage device, and a management server, configures the tenant which is a virtual system including a desired network device among the network devices, a virtual server realized by the server device, and a virtual storage realized by the storage device for each of clients, and accommodates a plurality of the tenants, the configuration management method comprising:

storing, in a tenant design item storage area, design items to be set in the devices and information indicating whether or not each of the design items depends on the tenant, for each of the devices constituting the tenant;

storing, in a design algorithm storage area, a calculation rule for calculating the design values of the design items so as to be different from each other for each of the tenants; and referring to the tenant design item storage area to specify the design items depending on the tenant among the design items corresponding to the devices constituting the tenant, calculating the design values of specified design items depending on the tenant according to the calculation rule in the design algorithm storage area, at the time of initially constructing the tenant.

According to the present invention, it is possible to provide a multi-tenant information processing system in which, at the time of initially constructing each tenant, design items depending on the tenant are specified according to devices constituting the tenant, and design values of the design items are promptly calculated without overlapping with other tenants.

BRIEF DESCRIPTION OF THE DRAWINGS

FIG. 5 is a diagram illustrating a configuration example of a tenant design item management table.

FIG. 6 is a diagram illustrating a configuration example of a configuration template.

FIG. 7 is a diagram illustrating a configuration example of a setting algorithm management table.

FIG. 8 is a diagram illustrating a configuration example of a tenant design value management table.

FIG. 9 is a diagram illustrating a configuration example of a tenant design value management table.

FIG. 10 is a diagram illustrating a configuration example of a tenant independent item management table.

FIG. 16 is a diagram illustrating a configuration example of a tenant pattern management table.

FIG. 17 is a diagram illustrating a configuration example of a command pattern management table.

FIG. 19 is a diagram illustrating a configuration example of a resource management table.

DETAILED DESCRIPTION OF THE PREFERRED EMBODIMENTS

1. First Embodiment

Figure 1:
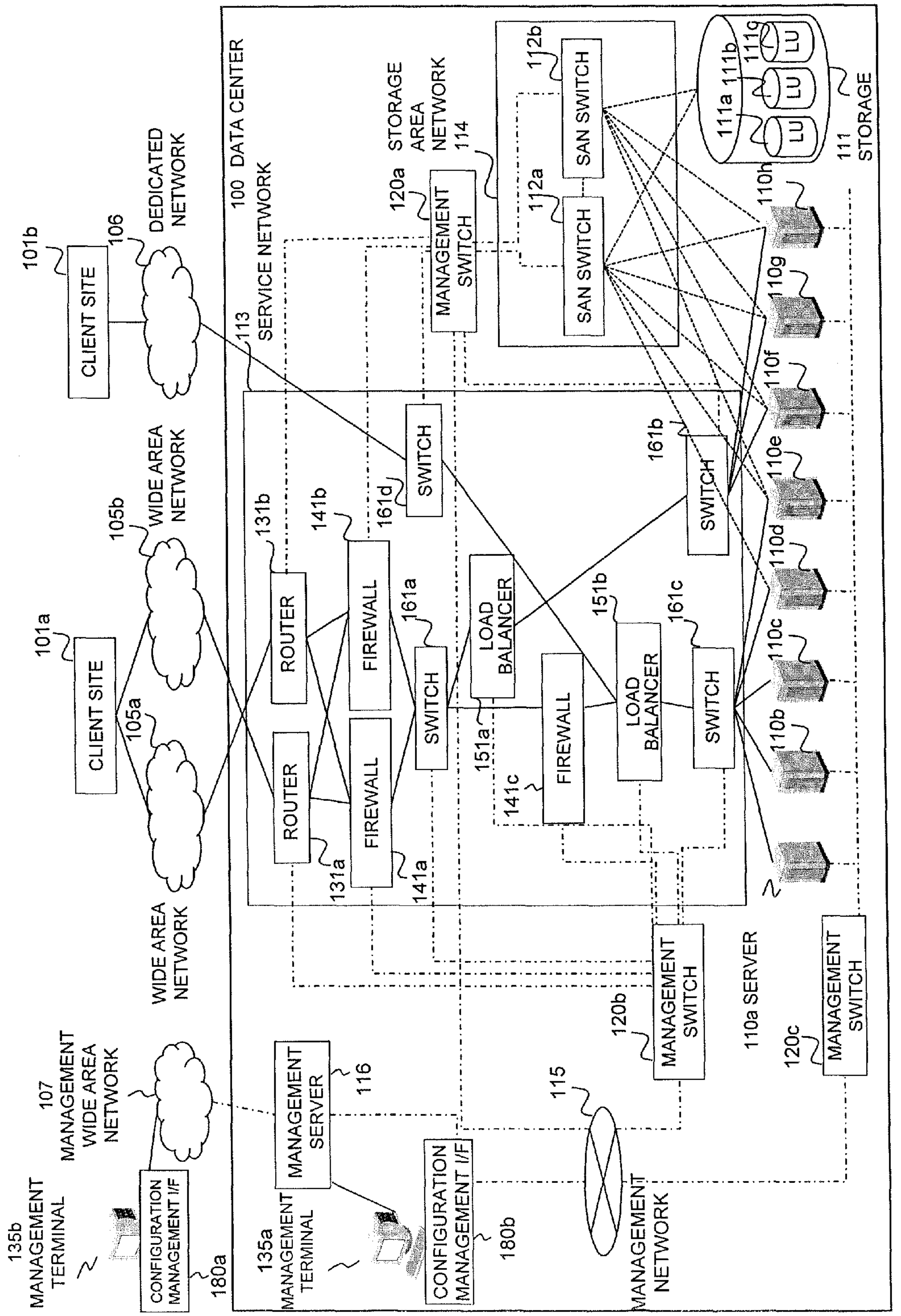
FIG. 1 is a diagram illustrating a system configuration according to a first embodiment of the present invention.

FIG. 1 is a diagram illustrating a system configuration according to a first embodiment of the present invention.

A data center 100 communicates with devices of client sites 101*a* and 101*b* through appropriate networks such as wide area networks 105*a*, 105*b*, and a dedicated network 106 such as a VPN (Virtual Private Network). The data center 100 includes a server 110 that provides clients with services, a storage area network (SAN) 114, a storage 111 that is connected to the server 110 through the storage area network 114, a service network 113, a management switch 120, a management server 116, and a management terminal 135*a* having a configuration management interface (I/F) 180*b*. The storage area network 114 includes one or more SAN switches 112*a* and 112*b*, and uses a storage connection protocol such as a fiber channel protocol. The storage 111 includes one or more virtual storages 111*a*, 111*b*, and 111*c*. Each of the virtual storages is called, for example, an LU (logic unit). The management switch 120 is connected to, for example, the respective devices (physical devices) within the data center 100, and connected to the management server 116 through a management network 115. Also, the management server 116 of the data center 100 communicates with a management terminal 135*b* having a configuration management I/F 180*a* through a management wide area network 107. The server 110 and the management switch 120 are not limited to one in number, but plural servers 110 and plural management switches 120 may be provided.

The management server 116 receives a tenant configuration management request from a management terminal 135 as an input, and specifies design items for each device configuring a tenant by the aid of information added to the request.

The service network 113 includes, for example, one or plural routers 131, firewalls 141, load balancers 151, and switches 161 as physical devices. The devices such as the plural routers 131, the firewalls 141, the load balancers 151, the switches 161, and the SAN switch 112*a* are selectively used according to requirements from the clients to configure the tenants. In the present specification, the tenant means a system virtually configured for each of the clients.

The router 131, the firewall 141, and the load balancer 151 are provided one by one as the physical devices, but may have a function of virtually providing the plural routers, firewalls, and load balancers, respectively. In this case, for example, one tenant may use one virtual router function of the physical router as the occasion demands. Alternatively, in recent years, an integrated network device having the functions of the router, the load balancer, and the firewall installed on one physical device may be provided. Further, in recent years, a virtual network appliance has also appeared in which the functions of the router 131, the firewall 141, and the load balancer 151 are configured by software, and installed on a virtual server. Accordingly, not only the physical devices but also virtual network appliance devices may be provided in the service network 113 to be subjected to configuration management. The physical devices, the integrated network device, the virtual network appliance devices, or an appropriate device, which provides the functions of the router 131, the firewall 141, the load balancer 151, the switch 161, and the SAN switch 112, is called a "network device" in this embodiment. When the integrated network device or the respective virtual network appliance devices are provided in the service network, only physical connection relationships among the devices within the service network 113 are different from each other. Items set for the devices are identical with those in the related art physical device, and not illustrated in this embodiment, and a configuration management method when the physical devices are used will be described.

Figure 14:
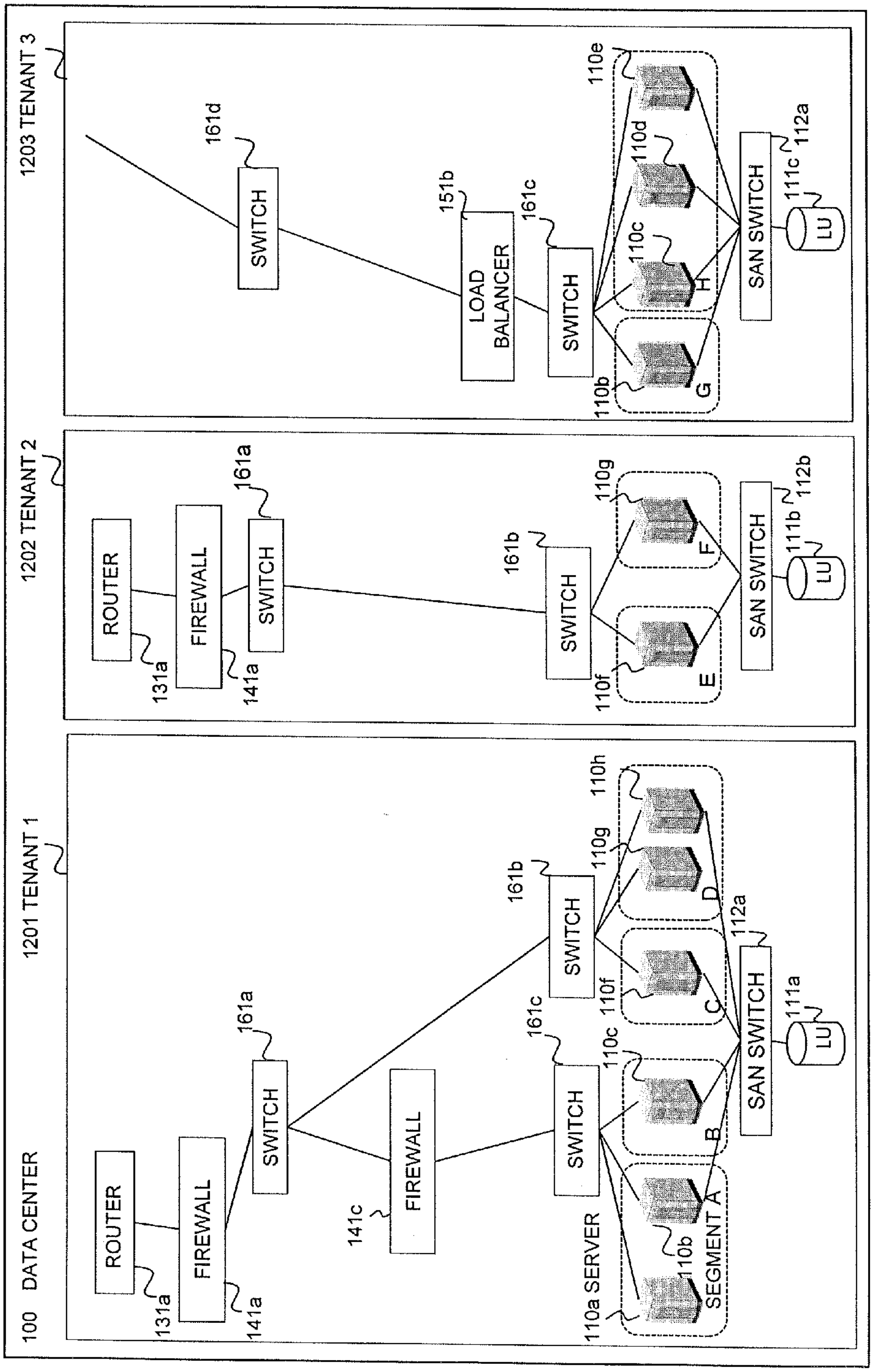
FIG. 14 is a diagram illustrating a configuration example of tenants according to the embodiment of the present invention.

FIG. 14 illustrates a configuration example of a multi-tenant system.

Within the data center 100, a virtual service network for each of the clients is configured by using the respective physical devices. The virtual service network also includes the storage area network using the SAN switch. The physical devices configuring the virtual service network are different depending on each tenant. The respective physical devices and the servers are used in the plural virtual service networks.

For example, a tenant 1 (1201) includes a router 131*a*, a firewall 141*a*, a switch 161*a*, a firewall 141*c*, switches 161*c* and 161*d*, the SAN switch 112*a*, and the LU 111*a*. The server 110 is disposed in plural segments. The tenant 1 in FIG. 14 includes, for example, segments A to D. Each of the segments is to section a portion (for example, the segments C and D in FIG. 14) in which a server group (for example, web server or mail server) used for a communication with the external such as an internet is arranged, which is generally called "demilitarized zone (DMZ)", or segments (for example, the segments A and B) in which business servers existing within a company network are arranged through the firewall 141*c*.

A tenant 2 (1202) includes, for example, the router 131*a*, the firewall 141*a*, the switch 161*a*, a switch 161*b*, the SAN switch 112*b*, and the LU 111*b*. Also, the tenant 2 includes segments E and F as the segments in which the server is arranged.

A tenant 3 (1203) includes, for example, the switch 161*d*, a load balancer 151*b*, the switch 161*c*, the SAN switch 112*a*, and the LU 111*c*. Also, the tenant 2 includes segments G and H as the segments in which the server is arranged.

The configuration shown in the tenant 3 is used in a case where the client site and the tenant access to each other through the dedicated network. The configurations of the tenants are not limited to the above configurations, but appropriate configurations can be applied.

FIG. 14 illustrates an example in which each tenant has the independent LU through the SAN switch. Alternatively, each tenant may have one or more LUs. Also, the respective tenants may share one LU. Also, for the purpose of improving the reliability, each tenant may be connected to an independent LU through the plural the SAN switches.

Figure 2:
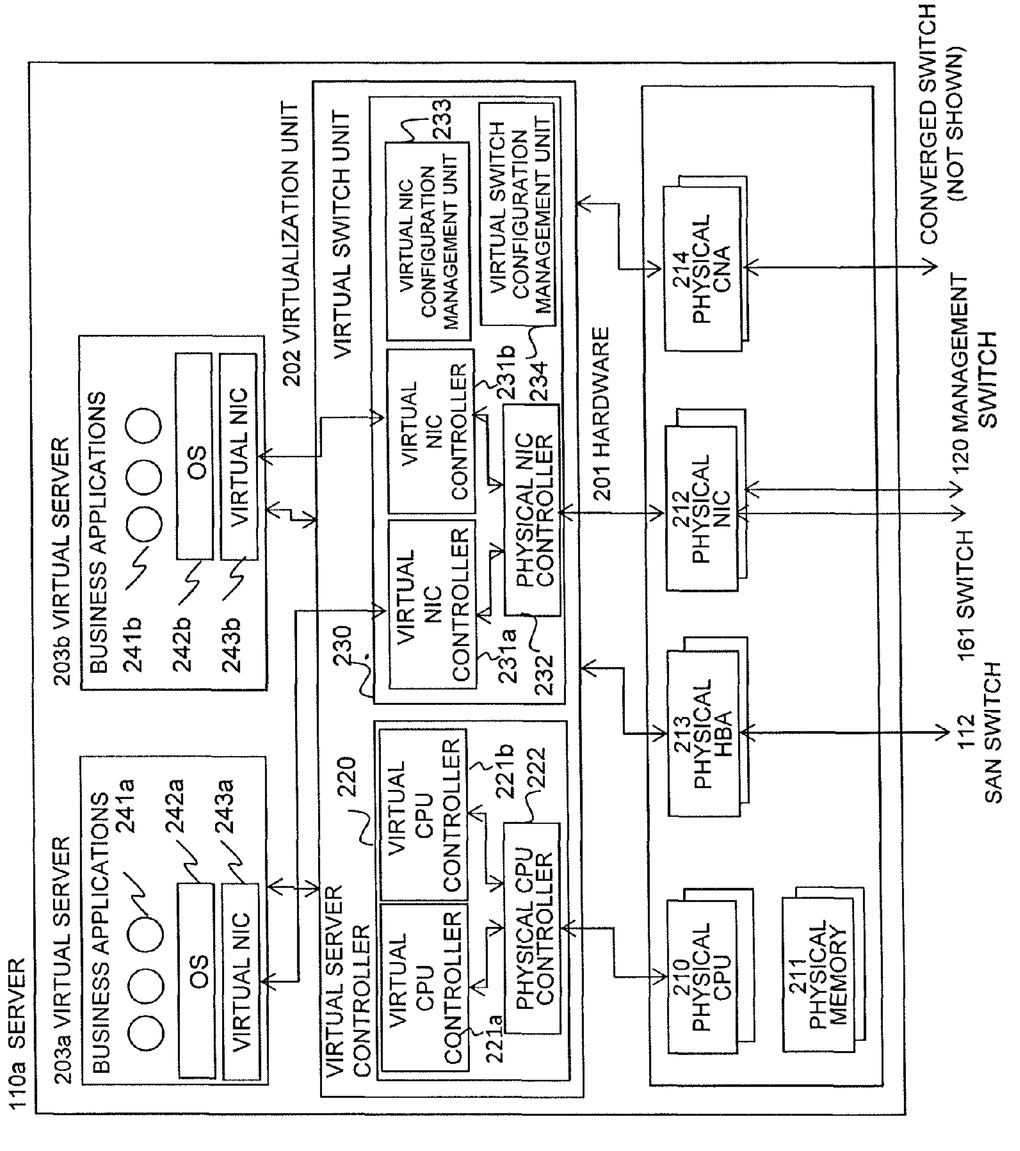
FIG. 2 is a diagram illustrating a configuration example of a server according to the embodiment of the present invention.

FIG. 2 illustrates a configuration example of a server 110*a* according to this embodiment. Since the same is applied to the configurations of the other servers 110*b* to 110*h*, the server 110*a* will be described, and a description of the other servers will be omitted.

The server 110*a* has a physical hardware 201. The physical hardware 201 includes a physical CPU 210, a physical memory 211, a physical network interface card (NIC) 212, a physical host bus adapter (HBA) 213. The server 110*a* may include a converged network adapter (CNA) 214 that converges the functions of the physical NIC and the physical HBA. The converged network adapter may accept, for example, InfiniBand or FCoE. In general, the CNA is available as a related art fiber channel card or a network card. Also, when the CNA is used, a switch that accepts a converged network protocol is used as a switch connected to an end of the CNA (not shown).

The server 110*a* is virtualized, and includes a virtualization unit 202, and virtual servers 203*a* and 203*b*. The virtualization unit 202 includes a virtual server controller 220 and a virtual switch unit 230. The virtual server controller 220 includes virtual CPU controllers 221*a* and 221*b*, and a physical CPU controller 222. The virtual server controller 220 operates in cooperation with the physical CPU 210, and allocates a virtual CPU resource to the virtual server 203. The virtual switch unit 230 includes virtual NIC controllers 231*a*, 231*b*, a physical NIC controller 232, a virtual NIC configuration management unit 233, and a virtual switch configuration management unit 234. The virtual NIC controllers 231*a*, 231*b*, and the physical NIC controller 232 operate in cooperation with the physical NIC 212, and allocate a virtual interface resource to the virtual server 203 as with the virtual server controller 220. The virtual NIC configuration management unit 233 sets a capacity and bandwidth of the virtual NIC. The virtual switch configuration management unit 234 manages the switches in communicating between the virtual servers.

The virtual server 203*a* includes a business application 241*a*, an operating system (OS) 242, and a virtual NIC 243. Although not shown, the virtual server 203*a* may include a virtual HBA and a virtual CNA. The same is applied to the virtual server 203*b*.

The server 110 may use VMware, Hyper-V, or Xen for the virtualization unit 202.

Figure 3:
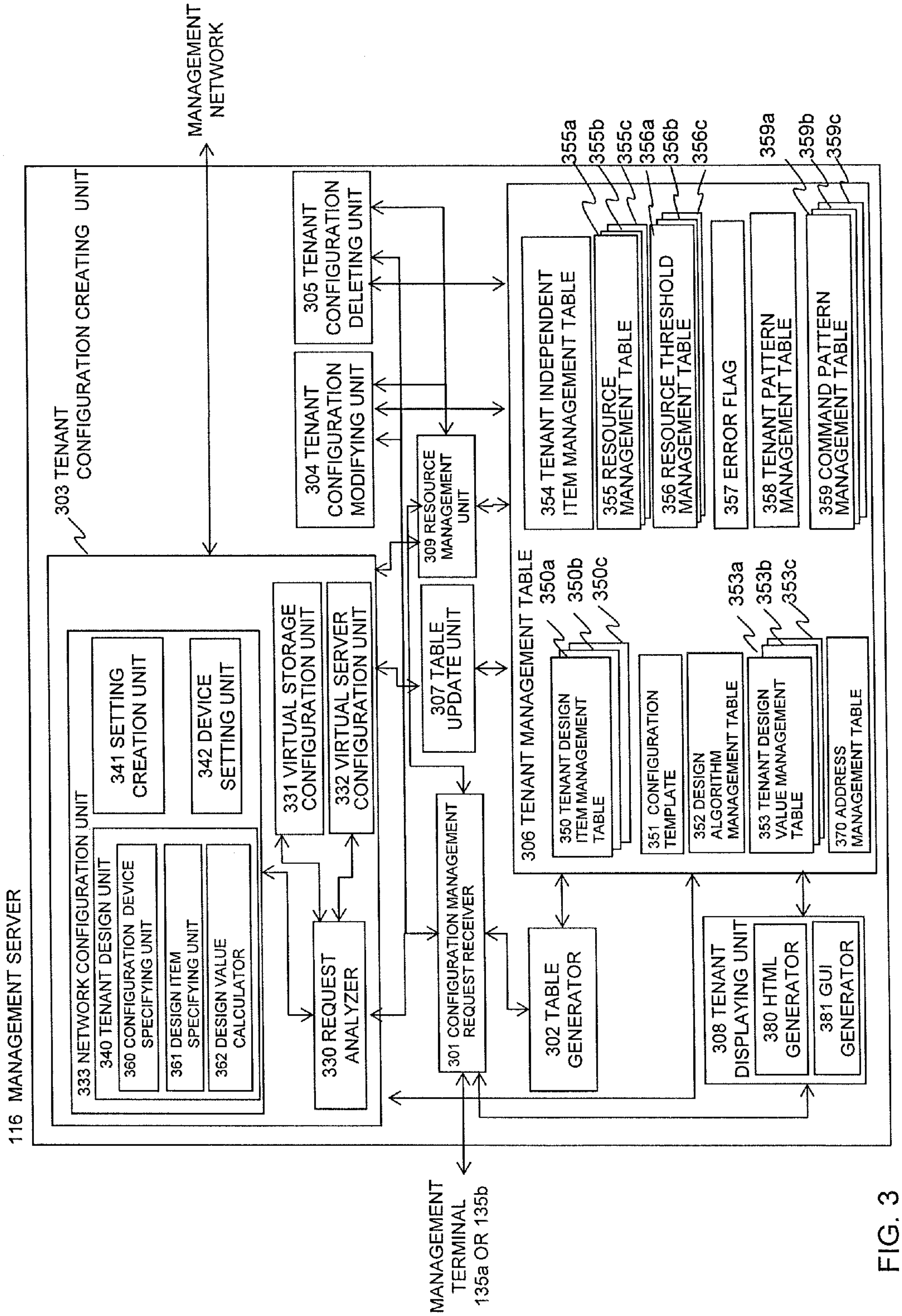
FIG. 3 is a diagram illustrating a configuration example of a management server according to the embodiment of the present invention.

FIG. 3 illustrates a configuration example of the management server 116 according to this embodiment.

The management server 116 includes, for example, a configuration management request receiver 301, a table generator 302, a tenant configuration creating unit 303, a tenant configuration modifying unit 304, a tenant configuration deleting unit 305, a tenant management table 306, a table update unit 307, a tenant displaying unit 308, and a resource management unit 309.

The configuration management request receiver 301 receives a configuration management request from the management terminal 135*a* or 135*b*, checks the contents of the configuration management request, and transfers the configuration management request to any one of the tenant configuration creating unit 303, the tenant configuration modifying unit 304, the tenant configuration deleting unit 305, the table generator 302, the tenant displaying unit 308, and the resource management unit 309. The configuration management request includes a request of creating the new tenant configuration, a request of modifying the tenant configuration, a request of deleting the tenant configuration, a request of creating setting commands of the tenant, a request of displaying the tenant configuration, a request of creating tables, and a request of initializing resources. Among those requests, request of creating setting commands of the tenant is designed to generate a command set for each of the devices by the aid of a tenant design value management table 353 on the basis of the request of creating the tenant configuration, the request of modifying the tenant configuration, and the request of deleting the tenant configuration. This request of creating setting commands of the tenant includes information for identifying the tenant. The request displaying the tenant configuration is designed to display the configuration of the generated tenant in the management terminal 135. The request displaying the tenant also includes identification information related to the tenant to be displayed. The request of initializing resources is designed to initialize a table for managing various resources used for the configuration of the tenant prior to the configuration management of the tenant. It is needless to say that the other requests may be provided as the occasion demands.

The table generator 302 generates various tables managed by the tenant management table 306, and registers information in the various tables.

The tenant configuration creating unit 303 specifies design items of each device at the time of initially constructing the tenant, and calculates design values of the specified design items. The tenant configuration creating unit 303 includes, for example, a request analyzer 330, a virtual storage configuration unit 331, a virtual server configuration unit 332, and a network configuration unit 333. The network configuration unit 333 includes, for example, a tenant design unit 340, a setting creation unit 341, and a device setting unit 342. Also, the tenant design unit 340 includes a configuration device specifying unit 360, a design item specifying unit 361, and a design value calculator 362.

The tenant configuration modifying unit 304 changes the tenant configuration. The tenant configuration modifying unit 304 specifies an appropriate item from the tenant management table 306, and changes the specified item through the table update unit 307. Although not shown, the tenant configuration modifying unit 304 includes a tenant design unit, a setting creation unit, and a device setting unit as with the tenant configuration modifying unit 304.

The tenant configuration deleting unit 305 deletes the tenant configuration. The tenant configuration deleting unit 305 deletes an appropriate item from the tenant management table 306 in addition to processing in the tenant configuration modifying unit 304. Although not shown, the tenant configuration deleting unit 305 includes a tenant design unit, a setting creation unit, and a device setting unit as with the tenant configuration modifying unit 304.

The tenant management table 306 includes, for example, a tenant design item management table 350, a configuration template 351, a design algorithm management table 352, a tenant design value management table 353, a tenant independent item management table 354, a resource management table 355, a resource threshold management table 356, an error flag 357, a tenant pattern management table 358, a command pattern management table 359, and an address management table 370. The respective tables will be described later. The respective tables may be storage areas of an appropriate storage form other than the table configuration.

The table update unit 307 adds, changes, or deletes an appropriate item of the tenant management table 306 according to an instruction from the tenant configuration creating unit 303, the tenant configuration modifying unit 304, or the tenant configuration deleting unit 305. The tenant displaying unit 308 includes an HTML generator 380 and a GUI generator 381. Upon receiving a request of displaying the tenant configuration through the configuration management request receiver 301, the HTML generator 380 generates, for example, a file of an HTML format according to information set in the tenant design value management table 353. Upon receiving the request of displaying the tenant configuration through the configuration management request receiver 301, the GUI generator 381 displays the tenant on the management terminal 135, for example, in a form of GUI according to the information set in the tenant design value management table 353. Whether the tenant is displayed in the form of HTML or GUI can be recognized by a factor of the request. In this embodiment, the HTML generator 380 and the GUI generator 381 are provided. However, a text format may be used for display. Also, a manager may display the design value in a desired format.

The resource management unit 309 initializes the contents of the resource management table 355 according to the configuration management request input through the configuration management request receiver 301. Also, the resource management unit 309 updates the contents of the resource management table 355 according to inputs from the tenant configuration creating unit 303, the tenant configuration modifying unit 304, and the tenant configuration deleting unit 305. Further, the resource management unit 309 sets the contents of the resource threshold management table 356 according to a request input through the configuration management request receiver 301.

The request analyzer 330 of the tenant configuration creating unit 303 analyzes, for example, whether the configuration management request input from the configuration management request receiver 301 is a configuration request of the virtual server of the tenant, a configuration request of the virtual storage of the tenant, or the network configuration request of the tenant. The virtual storage configuration unit 331 generates setting necessary for configuring the LU in plural storage devices necessary for configuring the tenant on the basis of a request analysis result. For example, the virtual storage configuration unit 331 accesses to the storage 111, and generates the LU by the aid of the generated setting. The virtual server configuration unit 332 generates setting in plural server devices necessary for configuring the tenant on the basis of the request analysis result. For example, the virtual server configuration unit 332 conducts the setting of the virtual NIC or the setting of the VLAN allocated to the NIC. The process of the virtual storage configuration unit 331 and the process of the virtual server configuration unit 332 can use known techniques. The network configuration unit 333 generates setting in a device groups configuring the service network 113 and the storage area network 114.

As described above, the network configuration unit 333 includes, for example, the tenant design unit 340, the setting creation unit 341, and the device setting unit 342. The network configuration unit 333 is also included in the tenant configuration modifying unit 304 and the tenant configuration deleting unit 305. However, because of the same configuration, the tenant configuration modifying unit 304 and the tenant configuration deleting unit 305 are omitted from the drawing.

For example, when the configuration management request input from the configuration management request receiver 301 is a network configuration management request of the tenant, the tenant design unit 340 specifies the devices configuring the tenant, specifies the design items set for the specified devices, and calculates the design values set for the design items. The setting creation unit 341 generates a setting command sequence set for the respective devices configuring the tenant on the basis of the design values designed by the tenant design unit 340. The device setting unit 342 sets the setting command sequence generated by the setting creation unit 341 for the subject devices.

The tenant design unit 340 includes the configuration device specifying unit 360, the design item specifying unit 361, and the design value calculator 362. When the configuration management request input from the configuration management request receiver 301 is the network configuration management request of the tenant, the configuration device specifying unit 360 specifies the devices constituting the tenant. For example, when the configuration requirement (configuration pattern identifier) of the tenant is included in the network configuration management request of the tenant, the configuration device specifying unit 360 extracts a configuration requirement, and specifies the devices set in the configuration template 351 as an appropriate table of the tenant management table 306. The design item specifying unit 361 specifies the setting items for the respective devices specified by the configuration device specifying unit 360. For example, the design item specifying unit 361 classifies and specifies the design items depending on the tenant, and the design items not depending on the tenant among the design items. The design value calculator 362 calculates the design values of the respective design items depending on the tenant configuration specified by the design item specifying unit 361 by the aid of the design algorithm management table 352 in the tenant management table 306. After calculation, the design value calculator 362 reflects the calculated design values in the tenant design value management table 353 of the tenant management table 306.

Subsequently, the respective tables of the tenant management table 306 will be described. The configuration examples of several tables will be described in more detail later.

The tenant design item management table 350 manages the design items necessary for designing the tenant for each of the devices configuring the multi-tenant information processing system. Also, the tenant design item management table 350 manages whether the respective design items are the design items depending on the tenant, or the design items not depending on the tenant. Those design items can be determined according to a design policy of the tenant such as how to design the tenant, the design items are set through the table generator 302 prior to the tenant design. Further, when the design items depend on the tenant, whether there is a need to newly calculate the design values of the design items, or the values already calculated are referred to is managed. The tenant design item management table 350 exists for each of the devices.

The configuration template 351 manages the configuration pattern of the tenant. In the multi-tenant information processing system, because the tenants of various configurations are mixed together, the configuration template 351 manages the configuration patterns taken by the tenants. For example, the devices used by the tenant are different depending on the pattern when one tenant of the multi-tenant information processing system configures a three-tiered Web system, or another tenant has only a calculation server such as grid computing.

The design algorithm management table 352 specifies the devices configuring the tenant, specifies the design items of the specified devices, and when the design items depend on the tenant, manages a calculation formula of the design values applied to the design items. Because the calculation formula of the design values are also determined according to the design policy of the tenant as with the design items of the tenant design item management table 350, the calculation formula is set through the table generator 302 prior to the tenant design. Not only the calculation formula, but a calculation rule of an appropriate format may be stored in the design algorithm management table 352.

The tenant design value management table 353 is designed to hold the design values designed by the tenant design unit 340, and exists for each of the tenants. The tenant design unit 340 specifies the devices by the configuration device specifying unit 360, specifies the items depending on the tenant among the design items of the devices by the design item specifying unit 361, and reflects the results of calculating the design values of the design items depending on the tenant by the design value calculator 362 in the tenant design value management table 353.

The tenant independent item management table 354 is referred by the design item specifying unit 361 when the design items of the devices do not depend on the tenant. Because the tenant independent item management table 354 is also determined according to the design policy of the tenant as with the tenant design item management table 350 and the design algorithm management table 352, the tenant independent item management table 354 is set through the table generator 302 from, for example, the management terminal 135 prior to the tenant design.

The resource management table 355 is used to confirm the usable resource when the design value calculator 362 calculates the design values. The resource management table 355 is referred to by the design value calculator 362, and updated by the table update unit 307 (or the resource management unit 309). For example, the resource management table 355 stores the usable resource (available resource) therein. The resource management table 355 is prepared according to the type of the resource to be managed.

The resource threshold management table 356 is used to confirm the usable resource when the design value calculator 362 calculates the design values. The resource threshold management table 356 is referred to by the design value calculator 362, and updated by the table generator 302 or the table update unit 307 (or the resource management unit 309). The resource threshold management table 356 is also prepared according to the type of the resource to be managed, and stores a threshold value for confirming whether the usable resource falls below a given value, or not therein.

The error flag 357 is set when the resource is short as a result that the remaining amount of resource is confirmed by the design value calculator 362. Also, the error flag 357 is reset when shortage in the resource is eliminated by updating the resource management table 355 or the resource threshold management table 356.

The tenant pattern management table 358 manages an identifier and a configuration pattern of the tenant (first corresponding information). The tenant pattern management table 358 is set at the time of newly configuring the tenant. Also, the tenant pattern management table 358 is referred to by the setting creation unit 341.

The command pattern management table 359 manages the devices included in the configuration pattern and a command template set in the devices (second corresponding information). The command template manages command sequences necessary for setting the respective devices in the tenant configuration creating, the tenant configuration modifying and the tenant configuration deleting. The command pattern management table 359 is prepared in advance for each type of the configuration patterns and the management requests.

The address management table 370 manages an IP address used by the tenant, and the identifier of the tenant using the IP address.

Figure 4:
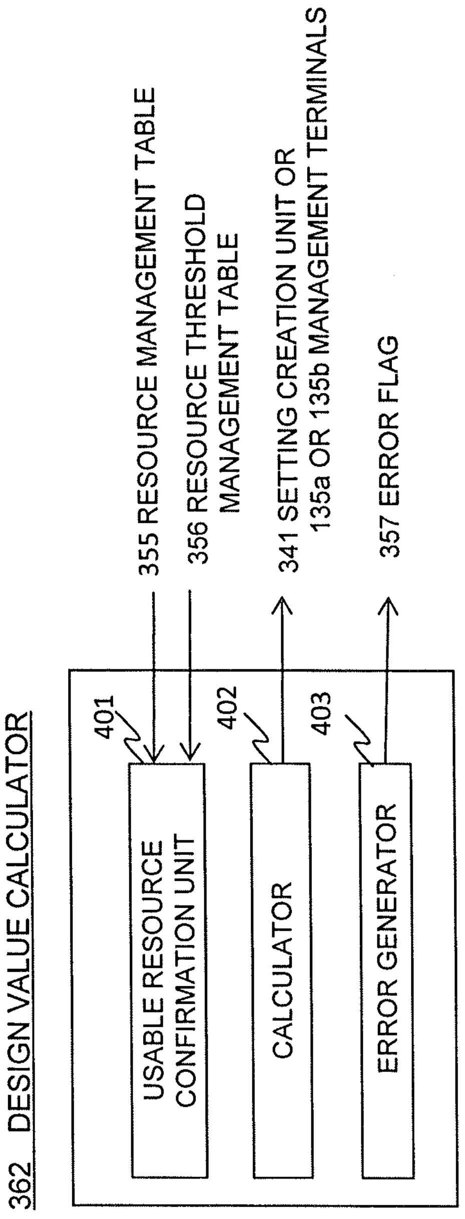
FIG. 4 is a diagram illustrating a configuration example of a design calculator according to the embodiment of the present invention.

FIG. 4 illustrates a configuration example of the design value calculator 362.

The design value calculator 362 includes a usable resource confirmation unit 401, a calculator 402, and an error generator 403. The usable resource confirmation unit 401 confirms the unused resource when the tenant is initially constructed, referring to appropriate items of the resource management table 355 and the resource threshold management table 356. When the unused resource is short, the design value calculator 362 conducts an error processing by the error generator 403. If the unused resource still exists, the design value calculator 362 conducts the processing of the calculator 402. The calculator 402 generates the design values of the subject design items by the aid of the calculation formula of the design algorithm management table 352. If the unused resource is short as a result of the process of the usable resource confirmation unit 401, the error generator 403 sets the error flag 357 of the tenant management table 306.

FIG. 5 illustrates a configuration example of the tenant design item management table 350. FIG. 5 illustrates a configuration example of an FW2 (firewall).

The tenant design item management table 350 is created through the table generator 302 according to a management request from the management terminal such as the operation of the manager in advance before the new configuration of the tenant. The tenant design item management table 350 is used to manage the design items necessary for configuring the tenant for each of the devices. The tenant design item management table 350 also manages whether the respective design items set for each of the devices necessary for configuring the tenant depend on the tenant, or not. Further, when the design items depend on the tenant, the tenant design item management table 350 manages the items as to whether the design values of the items must be calculated, or the items are referred to. Further, the tenant design item management table 350 holds, for example, when the design values are calculated or referred to, a table used for calculation or a pointer to a table to be referred.

As a more specific example, the tenant design item management table 350 includes design information 501, sub-items 502 of the design information, items 503 indicative of tenant dependence or independence, classification information 504 indicative of calculation or reference, pointers 505 to be accessed, and identifiers 506 to be referred. The design information 501 manages, for example, items necessary for design for each of the device. The sub-items 502 manage, for example, the items necessary for design for each of the design information 501. For example, a specific design item is specified by the design information 501 and the sub-items 502 of the design information. For example, in an example of FIG. 5, the tenant design item management table 350 manages two of a zone identifier and a virtual router identifier for the design information of a virtual router. The tenant dependence 503 manages whether the respective design items are information dependent on the tenant, or not, when configuring the tenant. In the example shown in the figure, for example, because the items of the zone identifier and the virtual router identifier depend on the tenant, "o" is marked on the tenant dependence 503. Because the item of a netmask of a sub-interface does not depend on the tenant, "x" is marked on the tenant dependence 503. The identification information and flags corresponding to "o" and "x" can be used on data. The classification 504 indicates whether the design values of the respective items should be calculated or referred. For example, when the same sub-items such as the zone identifier are used, the classification 504 prevents the different calculations, that is, classification of one of the same sub-items as calculation, and the other same sub-item as reference. Also, the amount of calculation can be reduced. The tenant design item management table 350 calculates the design values of the items described as calculation by the aid of the calculation formula described in the design algorithm management table 352. The tenant design item management table 350 obtains the design values of the items described as reference with reference to information of the table described in the pointers to be accessed 505, which is specified by the identifiers to be referred 506. The pointers to be accessed 505 holds the pointer to the table used for specifying the design values for each of the items. The identifiers to be referred 506 indicate which information to be viewed in the table used for specifying the design values.

FIG. 6 illustrates a configuration example of the configuration templates 351. The configuration template 351 manages a typical configuration pattern configuring the tenant. More specifically, the configuration template 351 manages which device to be used in a device group configuring the multi-tenant information processing system for each of the patterns. For example, in the multi-tenant information processing system, when the tenant of the web 3 hierarchies is configured, plural switches and plural firewalls are used. On the other hand, for example, when only a computation server for realizing grid computing is configured, a single switch and plural servers are used. In the configuration pattern illustrated in FIG. 6, only the network devices are managed. However, the servers and the storage devices may be managed. The configuration template 351 is set by the manager through the table generator 302 before the tenant design. When the configurations of the respective tenants in the multi-tenant information processing system are identical with each other, there is no need to provide the configuration template 351. If the devices constituting the tenant can be specified, the devices can be managed by any method.

The configuration template 351 includes configuration pattern identifiers 601 and configuration devices 602. The configuration pattern identifiers 601 are designed to uniquely specify the pattern. The configuration devices 602 manage identifiers of the devices used to configure the pattern for each of the configuration patterns.

FIG. 7 illustrates a configuration example of the design algorithm management table 352. The design algorithm management table 352 is designed to define how to determine the design values of the respective design items depending on the tenant. The management server 116 of the multi-tenant information processing system has at least one design algorithm management table 352. The design algorithm management table 352 includes identifiers 701 and calculation formulae 702. The identifiers 701 each have a value unique to the design item managed by the design algorithm management table 352. The computation formulae 702 are designed to calculate the design value for each of the design items. For example, an identifier T1-1 corresponds to a zone identifier of the virtual router in a tenant design item management table 350*a*. On the other hand, in the calculation formula of the design algorithm management table 352, the identifier T1-1 determines the zone identifier by using a calculation formula in which 1 is added to a maximum value of the generated tenant identifier. The tenant identifier is allocated, for example, at the time of newly configuring the tenant, and corresponds to a tenant identifier 1601 of the tenant pattern management table 358 which will be described later. Also, an identifier T1-2 corresponds to a virtual router identifier of the virtual router in the tenant design item management table 350*a*. The identifier T1-2 determines the virtual router identifier by using a calculation formula in which 1 is added to the maximum value of the generated tenant identifier in the calculation formula of the design algorithm management table 352.

FIG. 8 illustrates a configuration example of the tenant design value management table 353. The tenant design value management table 353 holds the design values designed by the tenant design unit 340, and exists, for example, in each of the tenants. In this embodiment, the tenant design value management table 353 is provided for each of the tenants, and any method is applicable if the method enables the design values to be managed for each of the tenants. The tenant design value management table 353 includes tenant identifiers 801, device identifiers 802, identifiers 803, design information 804, sub-items 805, design values 806, and reference destinations 807.

The tenant identifiers 801 uniquely identify the tenants configured within the multi-tenant information processing system. The device identifiers 802 are identifiers of the devices configuring the respective tenants. The identifiers 803 are designed to uniquely specify the respective design items managed by the tenant design value management table 353. The design information 804 and the sub-items 805 are synonymous with the design information 501 and the sub-items 502 of the tenant design item management table 350, respectively. The design values 806 hold values generated by new configuration of the tenant for each of the design items. The reference destinations 807 are set when the generated design items refer to the items already calculated. For example, the design value 806 "Zone 1" of the sub-item 805 "zone identifier" set in the identifier 803 "7" is "1-FW2-1" in the reference destination 807. This means reference to information set in an identifier "1" of a device identifier "FW2" of a tenant identifier "1" in the tenant design value management table 353. It is needless to say that respective information corresponding to identifiers "7", "11", and "15" can be also set at the same time when setting the identifier "1" of the device identifier "FW2" of the tenant identifier "1" in the tenant design value management table 353.

FIG. 9 illustrates a configuration example of a switch portion of the tenant design value management table 353. Respective items in the table of FIG. 9 have the same configurations as those in the table illustrated in FIG. 8, and therefore their detailed description will be omitted. In FIG. 9, the design items set in the switches are managed. The design items may be managed by a single table including the tables in FIGS. 8 and 9.

FIG. 10 illustrates a configuration example of the tenant independent item management table 354. The tenant independent item management table 354 is designed to manage the design items not depending on the tenant, and at least one tenant independent item management table 354 may be included in the multi-tenant information processing system. The tenant independent item management table 354 includes identifiers 1001 and design values 1002. The identifiers 1001 are designed to uniquely specify the items managed by the tenant independent item management table 354. The design values 1002 are set to values used as the design values of the respective identifiers. It is desirable that the design values 1002 are set through the table generator 302 by the manager in advance before the new configuration of the tenant.

FIG. 16 illustrates a configuration example of the tenant pattern management table 358. The tenant pattern management table 358 is designed to manage the configured tenants, and at least one tenant pattern management table 358 may be included in the multi-tenant information processing system. The tenant pattern management table 358 includes the tenant identifiers 1601, pattern identifiers 1602, tenant names 1603, and history identifiers 1604. The tenant identifiers 1601 are integers uniquely set to identify the tenants. The tenant identifiers 1601 are set, for example, in ascending order at the time of new configuration. The order other than the ascending order may be applied. However, in this case, the calculation formulae 702 are appropriately determined so that the setting values calculated by the calculation formulae 702 of the design algorithm management table 352 are prevented from overlapping with each other among the tenants. The pattern identifiers 1602 identify which of the configuration templates 351 configures the tenants. The tenant names 1603 are name information added to facilitate understanding of the tenants. The history identifiers 1604 are designed to manage configuration histories of the tenants, and set at the time of newly configuring the tenant, and reset when deleting the configuration of the tenant. For example, the history identifiers 1604 are set to 1 at the time of generating the tenant, and 0 at the time of deleting the tenant. When there is no need to manage deletion of the tenant, the history identifiers 1604 are not required.

FIG. 17 illustrates a configuration example of the command pattern management table 359. The command pattern management table 359 is prepared for each of the configuration templates and each type of the configuration management requests. For example, when four configuration templates and three types of the configuration management requests are provided, there are 12 command patterns. The command pattern management table 359 includes device identifiers 1701 and command patterns 1702. The setting creation unit 341 generates a setting command string set for each of the devices with reference to the tenant pattern management table 358, the command pattern management table 359, and the tenant design value management table 353 on the basis of the tenant identifier included in a command generation request when an analysis result of the new configuration request of the tenant is the command generation request.

FIG. 19 illustrates a configuration example of the resource management table 355. The resource management table 355 includes a resource management table 355*a* that manages a use status of a VRF, a resource management table 355*b* that manages a use status of the VLAN, and a resource management table 355*c* that manages a use status of the virtual router. The resource management table 355 manages a resource usage status and the identification information of the tenant using that resource for each of the identifiers on a resource basis. For example, the resource management table 355*a* includes identifiers 1901, usage statuses 1902, and tenant identifiers 1903. The identifier 1901 manages identifiers available as the VRF. Also, the resource management table 355*b* includes identifiers 1921 available as VLAN number, usage statuses 1922, and tenant identifiers 1923. Further, the resource management table 355*c* manages identifiers 1941 available as virtual router number, usage statuses 1942, and identification information 1943 of the used tenant identifier. When the resource to be managed exists other than the tables illustrated in FIG. 19, a table may be provided for that resource. Also, the resources may be managed in any methods if a correspondence relationship can be managed.

Figure 20:
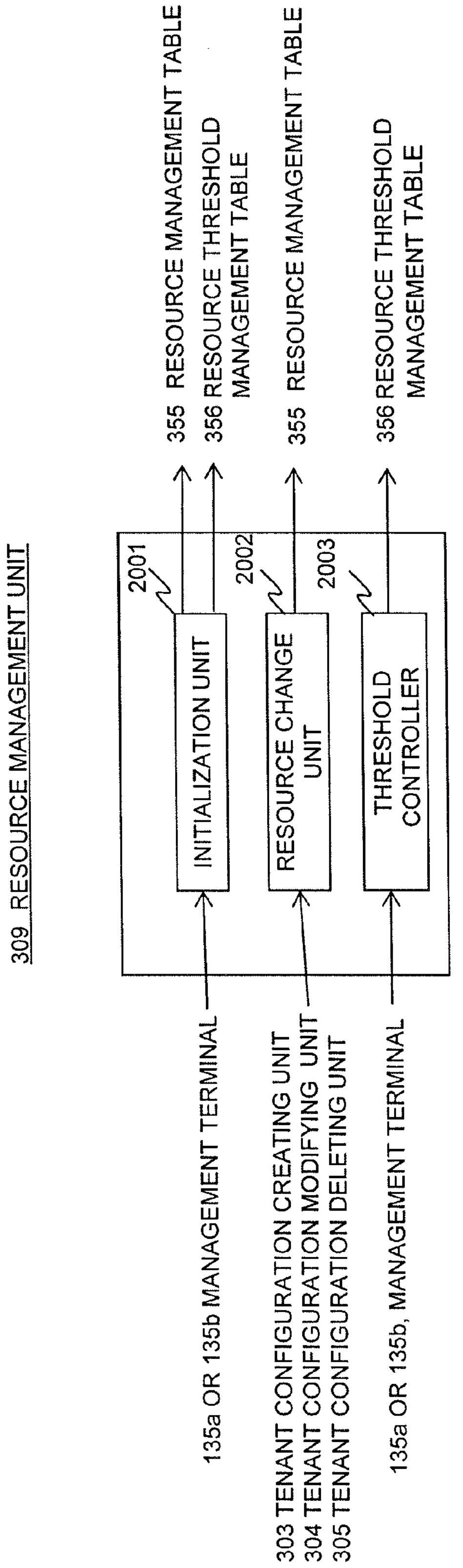
FIG. 20 is a diagram illustrating a configuration example of a resource management unit.

FIG. 20 illustrates a configuration example of the resource management unit 309. The resource management unit 309 includes, for example, an initialization unit 2001, a resource change unit 2002, and a threshold controller 2003. The initialization unit 2001 initializes the resource management table 355 according to an initialization request received from the configuration management request receiver 301. For example, when the number of resources to be managed increases due to introduction of a new network device, the initialization unit 2001 generates a table, and initializes table contents. When a resource is newly added, the initialization unit 2001 registers all of the resources as available. Also, when the resource is newly managed under the circumstance where the device has been already introduced, and there is the existing setting, the initialization unit 2001 registers the existing set resource as unavailable. The resource change unit 2002 receives inputs from the tenant configuration creating unit 303, the tenant configuration modifying unit 304, and the tenant configuration deleting unit 305, and updates the use status of the subject resource in the resource management table 355. For example, when the resource change unit 2002 receives the input from the tenant configuration creating unit 303, a new tenant consumes the resource. Therefore, the resource change unit 2002 registers that the appropriate resource has been "used" in correspondence with the identifier of that resource, and registers the identifier of the tenant at the same time. When the resource change unit 2002 receives the input from the tenant configuration modifying unit 304, if the resource change unit 2002 deletes any registered resource, and newly ensures a resource, the resource change unit 2002 clears information on a corresponding identifier portion of the registered resource, sets the use state of the identifier of the resource newly ensured as "used", and registers the tenant identifier to be used. When the resource change unit 2002 receives the input from the tenant configuration deleting unit 305, the resource change unit 2002 erases registered contents for the purpose of making the resource used by the tenant to be deleted available, and sets the use state as "available". For example, when the tenant to be deleted uses the VRF, the VLAN, and the virtual router, the resource change unit 2002 erases the registration of appropriate columns of all the resource management tables 355*a*, 355*b*, and 355*c*.

Figure 11:
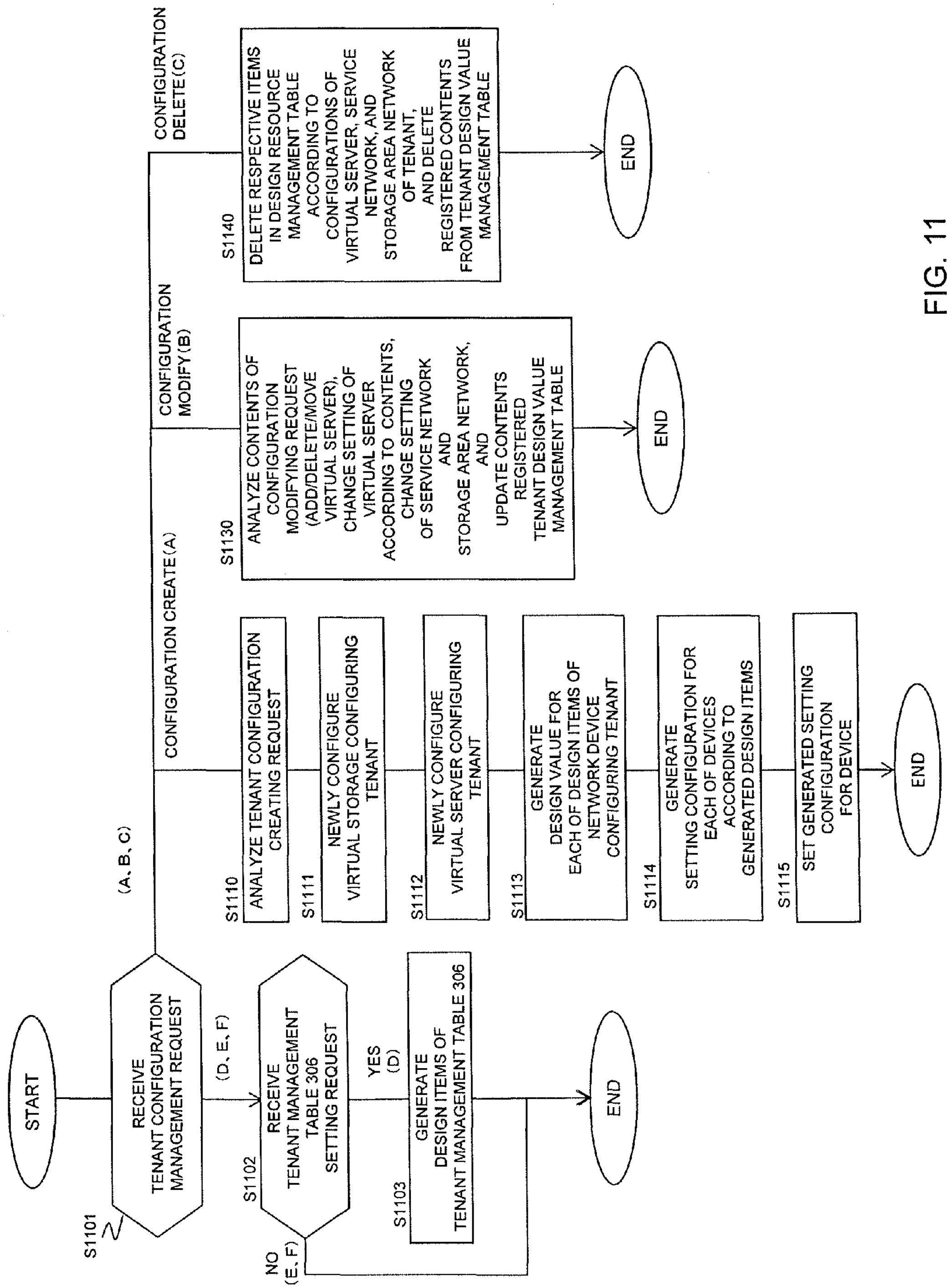
FIG. 11 is a flowchart illustrating a tenant system configuration management flow.

FIG. 11 illustrates a tenant system configuration management flow.

The configuration management request receiver 301 receives the tenant configuration management request from the management terminals 135*a* and 135*b* (S1101). The tenant configuration management request includes, for example, a tenant configuration creating request (A), a configuration modifying request (B), a configuration deleting request (C), a tenant management table setting request (D), a tenant displaying request (E), and a resource management request (F). Information for identifying those requests may be included in the tenant configuration management request. The configuration management request receiver 301 identifies whether the tenant configuration management request is the table setting request, the configuration creating, the configuration modifying, the configuration deleting, the tenant displaying, or the resource management. If the tenant configuration management request is the configuration creating, the configuration management request receiver 301 outputs the tenant configuration management request to the tenant configuration creating unit 303. On the other hand, if the tenant configuration management request is the configuration modifying, the configuration management request receiver 301 outputs the tenant configuration management request to the tenant configuration modifying unit 304. Further, if the tenant configuration management request is the configuration deleting, the configuration management request receiver 301 outputs the tenant configuration management request to the tenant configuration deleting unit 305. If the tenant configuration management request is the table setting request for generating various tables for tenant design, the configuration management request receiver 301 outputs the request to the table generator 302.

In this example, if the tenant configuration management request is the request for configuring a new tenant (configuration creating request), the configuration creating request includes, for example, a configuration pattern identifier indicating how the tenant is configured, information related to the number of resources in the server, and information related to the number of resources in the storage.

When the received tenant configuration management request is the setting request (D) for the tenant management table 306, the table generator 302 generates the setting item of the tenant management table 306, or the calculation formula of the design algorithm management table 352 (S1103). The respective tables can be set by using an appropriate technique. For example, a setting item file corresponding to the device may be created in advance, and set in an appropriate item of the tenant management table 306. Also, the respective tables may be sequentially set by the aid of a user interface.

If the received tenant configuration management request is the configuration modifying request (B), the tenant configuration modifying unit 304 analyzes the contents of the configuration modifying request, and specifies, for example, whether the configuration modifying request is virtual server addition, deletion, or movement. Then, the tenant configuration modifying unit 304 changes the setting of the virtual server according to the specified contents, changes the setting of the service network and the storage area network, and updates the registered contents of the tenant design value management table 353 (S1130).

If the received tenant configuration management request is the configuration deleting request (C), the tenant configuration deleting unit 305 deletes the respective items of the resource management table 355 according to the configurations of the virtual server, the virtual storage, the service network, and the storage area network of the tenant to be deleted, and deletes the registered contents from the tenant design value management table 353 (S1140).

If the received tenant configuration management request is the configuration creating request (A), the tenant configuration creating unit 303 newly configures the tenant. First, the request analyzer 330 analyzes the configuration creating request (S1110). Subsequently, upon receiving a result of analyzing the configuration creating request, the virtual storage configuration unit 331 newly configures the virtual storage constituting the tenant (S1111). In the new configuration of the virtual storage, the virtual storage configuration unit 331 generates, for example, the LU according to the number of virtual storages included in the new configuration request. The LU can be generated by using the same technique as that in the related art. When not only the number but also the performance and size are contained in the request, the virtual storage configuration unit 331 generates the LU according to the included information. The virtual storage configuration unit 331 may generate a storage other than the LU as the virtual storage. For example, the virtual storage configuration unit 331 may configure an iSCSI storage or a file storage. A method of generating those storages can use the same technique as that in the related art. The virtual server configuration unit 332 newly configures the virtual server constituting the tenant according to the number of servers included in the configuration creating request (S1112). In the new configuration of the virtual server, the virtual server configuration unit 332 generates, for example, a virtual machine. The virtual machine can be generated by using the same technique as that in the related art. Subsequently, the tenant design unit 340 of the network configuration unit 333 generates the design value for each of the design items of the network device constituting the tenant (S1113). Thereafter, the setting creation unit 341 generates a setting command on the basis of the design values generated by the tenant design unit 340 (S1114). The device setting unit 342 sets the setting command generated by the setting creation unit 341 for the subject device (S1115).

Figure 12:
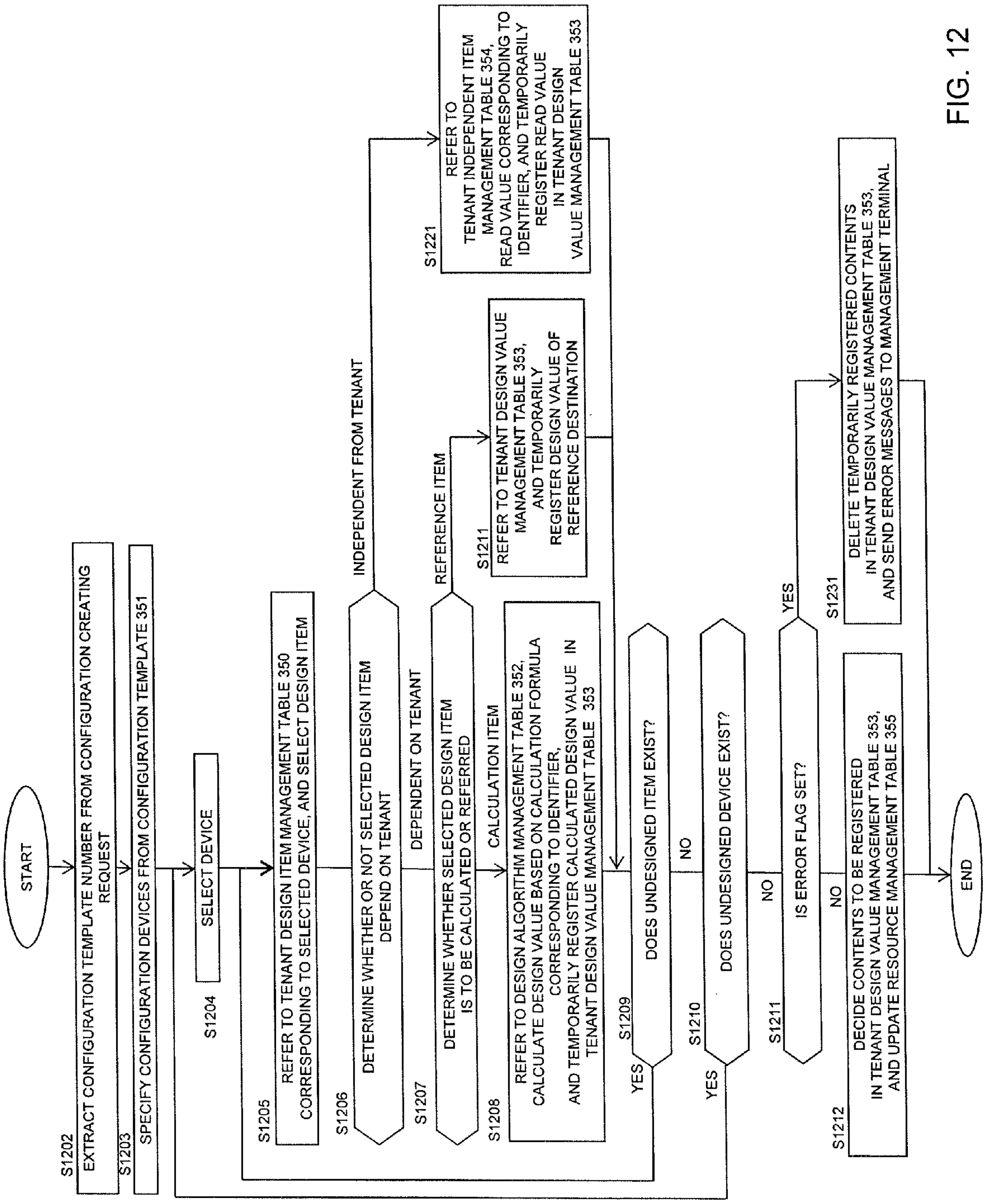
FIG. 12 is a flowchart illustrating a tenant new configuration flow.

FIG. 12 is a flowchart illustrating the design flow S1113 of the tenant.

In the tenant design flow, the tenant design unit 340 first extracts the configuration pattern identifier from the configuration creating request (S1202). The configuration pattern identifier may be included in the configuration creating request, or may be set from the management terminal 135, separately. Subsequently, the tenant design unit 340 refers to the configuration template 351, specifies the template corresponding to the configuration pattern identifier, and specifies the devices 602 to be used in the template (S1203). For example, when the configuration template identifier included in the configuration creating request is a configuration pattern 1, the tenant design unit 340 refers to an appropriate column of the configuration pattern identifiers 601 of the configuration template 351, and specifies that the configuration devices 602 are a switch 1 and an FW1. Also, the tenant design unit 340 stores the tenant identifiers 1601, the pattern identifiers 1602, the tenant names 1603, and the history identifiers 1604 in the tenant pattern management table 358.

Subsequently, the tenant design unit 340 selects one of the configuration devices 602 (S1204). Then, the tenant design unit 340 refers to the tenant design item management table 350 corresponding to the selected device, and selects one of the design sub-items 502 (S1205). The tenant design unit 340 determines whether the selected design item depend on the tenant, or not (independent), according to the tenant dependence 503 (S1206). If the selected design item depend on the tenant, the tenant design unit 340 shifts to S1207 whereas if the selected design item does not depend on the tenant, the tenant design unit 340 shifts to Step S1221. If the selected design item depend on the tenant, the tenant design unit 340 determines whether the selected design item is designed to calculate the design value, or to refer to the design value, according to the classification 504 (S1207). If the selected design item is designed to calculate the design value, the tenant design unit 340 shifts to Step S1208 whereas if the selected design item is designed to refer to the design value, the tenant design unit 340 shifts to Step S1211. If the selected design item is designed to calculate the design value, the tenant design unit 340 refers to the design algorithm management table 352, calculates the design value on the basis of the calculation formula 702 corresponding to the identifier 506 and 701, and temporarily registers the calculated design value in the tenant design value management table 353 (S1208). Thereafter, the tenant design unit 340 shifts to S1209. Step S1208 will be described in more detail later.

On the other hand, if the design item selected in Step S1206, does not depend on the tenant, the tenant design unit 340 reads the design value 1002 corresponding to concerned identifier 1001 in the tenant independent item management table 354 according to the pointer to be accessed 505 and the identifier to be referred 506, temporarily registers the read design value 1002 in the tenant design value management table 353, and shifts to a subsequent step S1209.

In Step S1207, if the selected design item is the reference item, the tenant design unit 340 retrieves the tenant identifier 801, the device 802, and the identifier 803 of the tenant design value management table 353 according to the pointer to be accessed 505 and the identifier to be referred 506, specifies an entry corresponding to the identifier to be referred 506, and refers to the corresponding design value 806. The tenant design unit 340 temporarily registers the referred design value as the design value of the design item, and shifts to the subsequent step S1209.

In Step S1209, the tenant design unit 340 determines whether unselected design item exists, or not, and if the unselected design items exists, the tenant design unit 340 returns to Step S1205. If no design item to be selected exists, the tenant design unit 340 shifts to a subsequent step (S1209). After all of the design items have been designed, the tenant design unit 340 determines whether there are undesigned devices, or not. If there are the undesigned devices, the tenant design unit 340 returns to Step S1204 whereas if there are no undesigned devices, the tenant design unit 340 returns to Subsequent Step (S1210). Then, the tenant design unit 340 determines whether an error flag is set, or not (S1211). If the design values are calculated, the error flag is set when the resources to be allocated to the tenant are short within the multi-tenant information processing system. If the error flag is set, the tenant design unit 340 executes the process in Step S1231. On the other hand, if no error flag is set, because the design items could be designed without any problem, the tenant design unit 340 decides the contents temporarily registered in the tenant design value management table 353, and also updates the resource usage status of the resource management table 355 (S1212). Then, the tenant design unit 340 completes the tenant design flow.

Also, in Step S1211, if the error flag is set, the tenant design unit 340 deletes the temporarily registered contents of the tenant design value management table 353, generates an error message, and sends the generated error message to the management terminal 135 (S1231).

Figure 13:
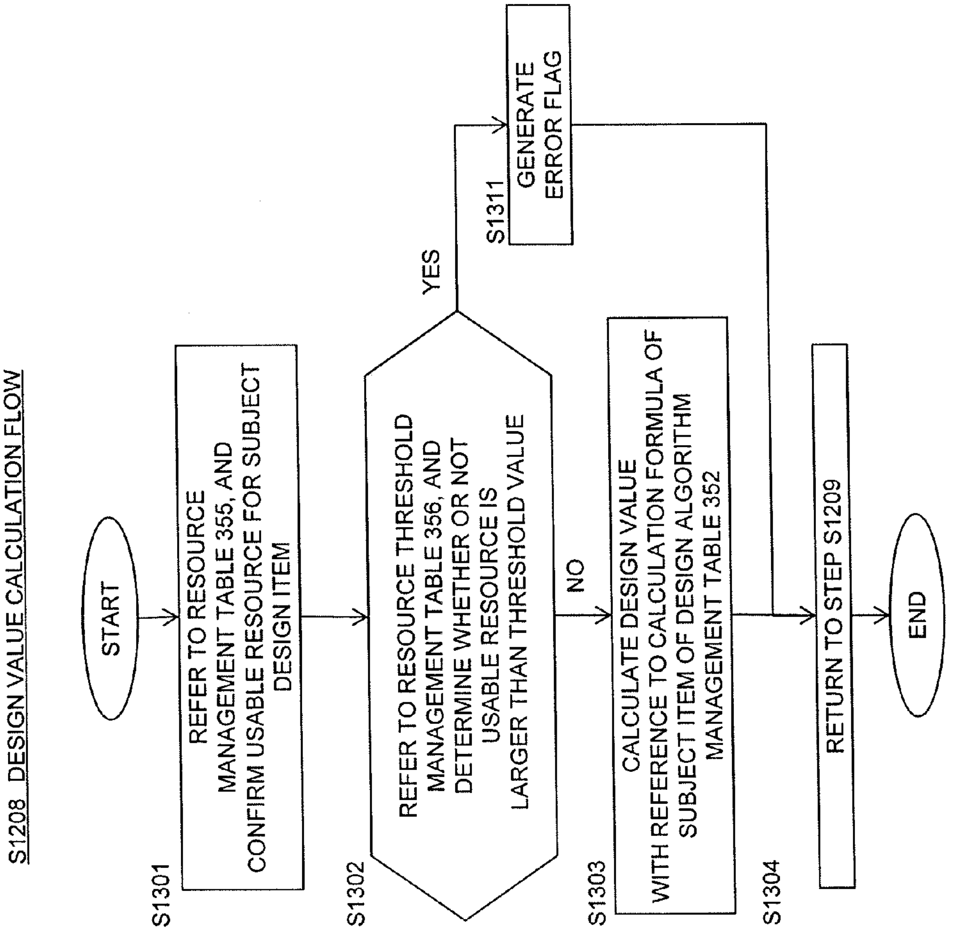
FIG. 13 is a flowchart illustrating a design value calculation flow.

FIG. 13 is a flowchart illustrating the design value calculation flow S1208 among the tenant design flow. In this flow, the tenant design unit 340 first refers to the resource management table 355, and confirms the usable resource for the subject design item (S1301). Subsequently, the tenant design unit 340 refers to the resource threshold management table 356, and determines whether the usable resource for the subject design item is larger than a threshold value, or not (S1302). If the remaining amount of resource is larger than the threshold value, because the tenant can be designed, the tenant design unit 340 shifts to processing in a subsequent step S1303. On the other hand, if the usable resource is equal to or smaller than the threshold value, the tenant design unit 340 shifts to processing in Step S1311. In Step S1303, the tenant design unit 340 specifies the entry that the identifier 701 of the design algorithm management table 352 correspond to the identifier to be referred 506 according to the pointer to be accessed 505 and the identifier to be referred 506, and calculates the design value with reference to the calculation formula 702 of the corresponding subject item (S1303). A maximum value of the generated tenant identifiers may be appropriately stored and updated. In this embodiment, the tenant design unit 340 refers to the maximum value among the tenant identifiers 1601 of the tenant pattern management table 358. In addition, respective information required for the calculation formulae can be extracted from the tables, the configuration management requests, and the like. After calculation, the tenant design unit 340 returns to the Step S1209.

In Step S1302, if the usable resource is equal to or smaller than the threshold value, the tenant design unit 340 sets the error flag 357. The reason that the error flag 357 is set is because if a part of the resource cannot be ensured, the tenant cannot be newly configured, and therefore the design needs to be invalidated. For example, if a certain resource for the tenant configuration cannot be ensured, information temporarily registered in the tenant is cleared according to the error flag.

Figure 18:
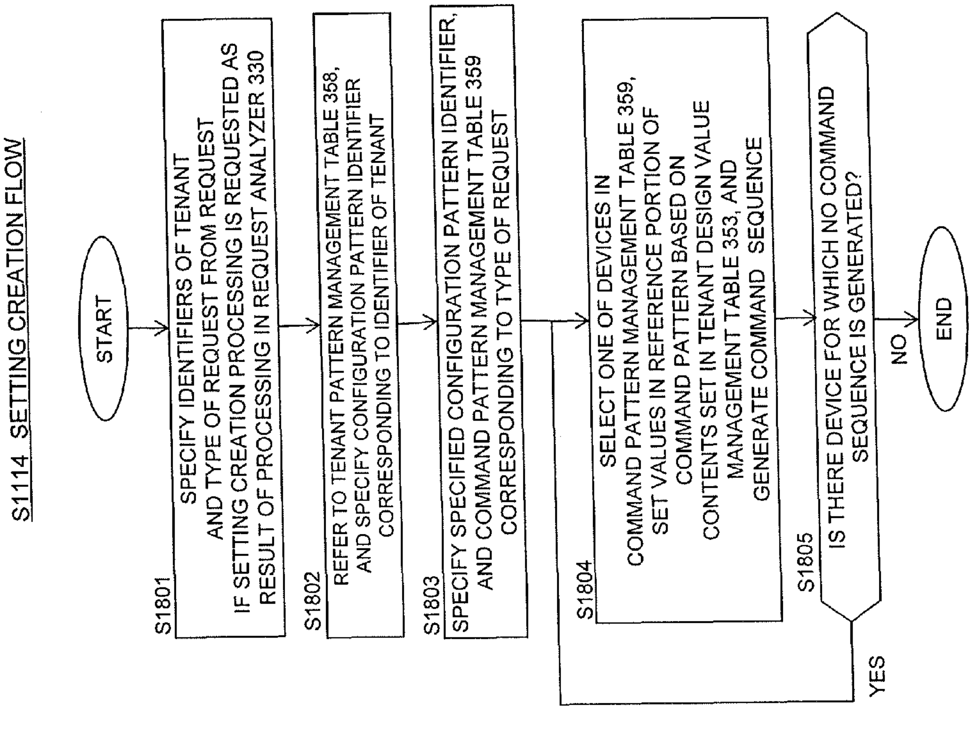
FIG. 18 is a flowchart illustrating a setting generation flow.

FIG. 18 is a flowchart illustrating the flow S1114 for generating the setting commands for each of the devices by the aid of the design values generated in the tenant design unit 340. In this flow, as a result of processing in the request analyzer 330, if the management terminal 135 requests the setting creation process, the setting creation unit 341 specifies the identifier of the tenant and the type of request (configuration create, etc.) from the request (S1801). This request may be issued to the setting creation unit 341 from the tenant design unit 340 by completing the calculation of the design values in response to the request for the above-mentioned configuration create or the configuration modify, other than the input from the management terminal 135. Then, the tenant design unit 340 refers to the tenant pattern management table 358, and specifies the configuration pattern identifier corresponding to the identifier of the specified tenant (S1802). Then, the tenant design unit 340 specifies the specified configuration pattern identifier and the command pattern management table 359 corresponding to the type of request (S1803). The tenant design unit 340 selects one device from the device group registered in the device identifiers 1701 column of the specified command pattern management table 359, sets values to a reference portion of the command patterns 1702 on the basis of the contents (design values) set in the tenant design value management table 353, and generates a command sequences (S1804). More specifically, when the tenant design unit 340 selects an SW1 as the device of the command pattern management table 359, the tenant design unit 340 refers to a command pattern column, reads <VLAN identifiers>, <gateway identifiers>, and <netmasks> from appropriate columns of the tenant design value management table 353, and generates the command sequences with addition of read information. The generated command sequences may be displayed on a screen for each of the devices, or may be held in a file format for each of the devices. The command sequences may be managed in a desired format of the manager. Then, the tenant design unit 340 repeats the process until the command sequences to be set for all of the devices registered in the command pattern management table 359 have been generated (S1805). Thereafter, the device setting unit 342 transmits the respective command patterns to the corresponding devices for setting. If the confirmation by the manager is unnecessary, the device setting unit 342 may automatically set the results of generating the command sequences for the devices constituting the tenant on the basis of the design values designed by the tenant design unit 340.

According to this embodiment, the design items depending on the tenant can be promptly and easily specified from the design items set in the device group constituting the tenant at the time of initially constructing the tenant.

Also, the setting values of the design items depending on the specified tenant are calculated without overlapping with the setting values of another tenant, as a result of which the rapid initial configuration of the tenant can be realized to improve the design efficiency while ensuring the independence of setting among the tenants.

As compared with the related art, in the complicated system according to this embodiment, at the time of initially configuring the tenant, the design items depending on the tenant are promptly and simply specified from the design items corresponding to the devices constituting the tenant, and the design values of the specified design items are calculated without overlapping with each other among the tenants, thereby enabling the independence among the tenants to be easily ensured.

2. Second Embodiment

In a second embodiment, when the configurations of the respective tenants configured in the multi-tenant information processing system are identical with each other, the design items depending on the tenant are specified from the setting items of the devices, and the setting values of the specified design items are calculated.

The system configuration in the second embodiment of the present invention is identical with that in the first embodiment, and therefore will be omitted from the drawing. The configuration template 351 can be omitted. The design flow of the tenant is partially changed.

Figure 15:
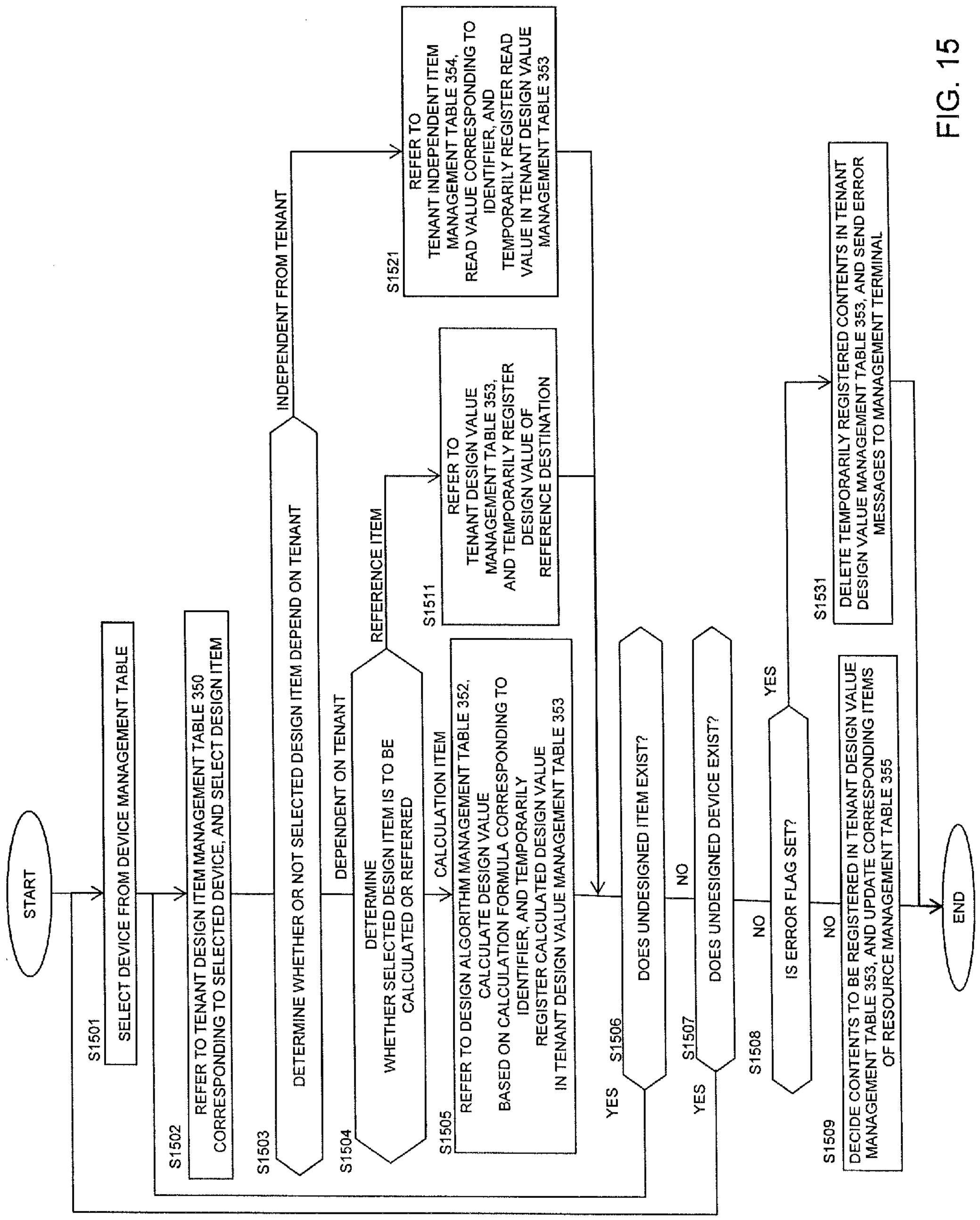
FIG. 15 is a flowchart illustrating a tenant new configuration flow according to a second embodiment of the present invention.

FIG. 15 illustrates a modified example of the design flow of the tenant. If the configurations of the respective tenants configured in the multi-tenant information processing system are identical with each other, a process of specifying the configuration of the tenant by the configuration template 351 is unnecessary. Therefore, the processes in Steps S1202 and S1203 of FIG. 12 are not required. Instead, the devices are selected by the aid of a unit for specifying the devices used by the multi-tenant information processing system (S1501). Any method may be applicable if what device is used can be specified.

3. Others

The multi-tenant information processing system, the management server, and the configuration management method according to this embodiment can be provided by a configuration management program that allows a computer to execute the respective procedures, a computer readable recording medium recording the configuration management program, a program product including the configuration management program and loadable in an internal memory of the computer, or a computer including the program such as the server.

The present invention is applicable to, for example, the multi-tenant information processing system.

What is claimed is:

1. A management server in a multi-tenant information processing system which includes a plurality of types of network devices, a server device, a storage device, and the management server, configures a plurality of tenants, each of the plurality of tenants being a virtual system including a desired network device among the network devices or a virtual network device, a virtual server on the server device, and a virtual storage on the storage device for each of a plurality of clients, and accommodates the plurality of tenants, the management server comprising:

a tenant design item table in which design items to be set and information, indicating whether or not each of the design items depends on each of the plurality of tenants, are stored in advance for each device in each virtual system constituting each of the plurality of tenants;

a design algorithm table in which one or more calculation rules for calculating design values of the design items is/are stored in advance in correspondence with the design items, wherein the design values are different from each other for each of the plurality of tenants;

a tenant design unit that specifies, based on the information in the tenant design item table at the time of initially constructing each of the plurality of tenants, the design items depending on one or more of the plurality of tenants among the design items for devices constituting the plurality of tenants, calculates the design values of specified design items depending on the one or more of the plurality of tenants according to the one or more calculation rules in the design algorithm table, and stores calculated design values;

a configuration request receiver in the management server that receives a configuration request and input information; and a tenant design value table that stores, for each of the plurality of tenants, the design values of design items for each device constituting each of the plurality of tenants at the time of initially constructing each of the plurality of tenants;

wherein the tenant design unit stores calculated design values of the design items in the tenant design value table.

2. The management server according to claim 1, further comprising:

a configuration template in which identification information of the devices constituting each of the plurality of tenants is stored in advance in correspondence to configuration pattern identifiers, wherein the tenant design unit refers to the configuration template based on the configuration pattern identifiers which are input, and specifies the devices constituting each of the plurality of tenants to be initially constructed.

3. The management server according to claim 2, wherein the management server registers respective information items in the configuration template in advance before each of the plurality of tenants is initially configured.

4. The management server according to claim 1, wherein the management server registers respective information items in the tenant design item table and the design algorithm table in advance before each of the plurality of tenants is initially configured.

5. The management server according to claim 1, wherein the tenant design item table further stores classification information indicating whether to calculate a new design value of a design item of the plurality of design items according to the one or more calculation rules, or to refer to a design value already calculated for the design item, wherein the design item depends on the one or more of the plurality of tenants, and the tenant design unit calculates the new design value of the design item according to the one or more calculation rules, and stores the new design value.

6. The management server according to claim 5, wherein the tenant design item table further stores destination information, and the tenant design unit reads the design value already calculated, with respect to the design item which is indicated by the classification information to refer to the design value already calculated, according to the destination information, and stores the design value already calculated as the new design value of the design item.

7. The management server according to claim 1, further comprising:

a resource management table that manages resources of the plurality of types of network devices, wherein, when calculating the design values of the specified design items, the management server refers to the resource management table to determine whether or not the resources are insufficient.

8. The management server according to claim 1, further comprising:

a setting creation unit that manages a first corresponding information having identification information for uniquely identifying a constructed tenant associated with configuration device information of the constructed tenant indicating what devices are used to constitute the constructed tenant, and a second corresponding information having the configuration device information of the constructed tenant associated with a command string set for the devices, and creates the command sequence for each of the devices by using the first corresponding information and the second corresponding information on the basis of the identification information of the constructed tenant included in the configuration request which is input.

9. The management server according to claim 8, wherein the setting creation unit adds a design value of corresponding device, which is stored in the tenant design value table, into the commands of the second corresponding information, and creates the command string set for each of the devices.

10. The management server according to claim 8, further comprising:

a device setting unit that transmits the command string set to the corresponding device for setting the command sequence.

11. A multi-tenant information processing system which includes a plurality of types of network devices, a server device, a storage device, and a management server, configures a plurality of tenants, each of the plurality of tenants being a virtual system including a desired network device among the network devices or a virtual network device, a virtualized server on the server device, and a virtualized storage on the storage device for each of a plurality of clients, and accommodates the plurality of tenants, wherein the management server comprises:

a tenant design item table in which design items to be set and information, indicating whether or not each of the design items depends on each of the plurality of tenants, are stored in advance for each device in each virtual system constituting each of the plurality of tenants;

a design algorithm table in which one or more calculation rules for calculating design values of the design items is/are stored in advance in correspondence with the design items, wherein the design values are different from each other for each of the plurality of tenants;

a tenant design unit that specifies, based on the information in the tenant design item table at the time of initially constructing each of the plurality of tenants, the design items depending on one or more of the plurality of tenants among the design items for each device in each virtual system constituting the plurality of tenants, calculates the design values of specified design items depending on the one or more of the plurality of tenants according to the one or more calculation rules in the design algorithm table, and stores calculated design values;

a configuration request receiver in the management server that receives a configuration request and input information; and a tenant design value table that stores, for each of the plurality of tenants, the design values of design items for each device constituting each of the plurality of tenants at the time of initially constructing each of the plurality of tenants;

wherein the tenant design unit stores calculated design values of the design items in the tenant design value table.

12. The multi-tenant information processing system according to claim 11, wherein the management server creates a setting command for each device in each virtual system on the basis of the design value, and outputs the setting command to each device in each virtual system constituting each of the plurality of tenants to reconfigure each of the plurality of tenants.

13. A configuration management method for obtaining design values set for devices constituting a plurality of tenants at the time of reconfiguring the plurality of tenants, in a multi-tenant information processing system which includes a plurality of types of network devices, a server device, a storage device, and a management server, configures each of the plurality of tenants, each of the plurality of tenants being a virtual system including a desired network device among the network devices or a virtual network device, a virtual server realized by the server device, and a virtual storage realized by the storage device for each of a plurality of clients, and accommodates the plurality of tenants, the configuration management method comprising:

storing, in a tenant design item table, design items to be set in each of a plurality of devices constituting the plurality of tenants and information indicating whether or not each of the design items depends on each of the plurality of tenants, for each of the plurality of devices constituting the plurality of tenants;

storing, in a design algorithm table, one or more calculation rules for calculating the design values of the design items, wherein the design values are different from each other for each of the plurality of tenants;

specifying, in a tenant design unit, based on the information in the tenant design item table at the time of initially constructing each of the plurality of tenants, the design items depending on one or more of the plurality of tenants among the design items corresponding to devices constituting the plurality of tenants;

calculating, by the tenant design unit, the design values of specified design items depending on the one or more of the plurality of tenants according to the one or more calculation rules in the design algorithm table;

receiving, by a configuration request receiver in the management server, a configuration request and input information; and storing, in a tenant design value table, for each of the plurality of tenants, the design values of design items for each device constituting each of the plurality of tenants at the time of initially constructing each of the plurality of tenants;

wherein the tenant design unit stores calculated design values of the design items in the tenant design value table.

* * * * *